(12) United States Patent
Armbrust et al.

(10) Patent No.: US 12,019,682 B2
(45) Date of Patent: *Jun. 25, 2024

(54) DATAFLOW GRAPH PROCESSING

(71) Applicant: Databricks, Inc., San Francisco, CA (US)

(72) Inventors: Michael Paul Armbrust, Berkeley, CA (US); Andreas Neumann, Oakland, CA (US); Mukul Murthy, San Francisco, CA (US); Jonathan Mio, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,349

(22) Filed: Dec. 27, 2022

(65) Prior Publication Data

US 2023/0140169 A1 May 4, 2023

Related U.S. Application Data

(63) Continuation of application No. 17/362,450, filed on Jun. 29, 2021, now Pat. No. 11,567,998.

(Continued)

(51) Int. Cl.
*G06F 16/901* (2019.01)
*G06F 16/215* (2019.01)
(Continued)

(52) U.S. Cl.
CPC ........ *G06F 16/9024* (2019.01); *G06F 16/215* (2019.01); *G06F 16/2282* (2019.01); *G06F 16/245* (2019.01)

(58) Field of Classification Search
None
See application file for complete search history.

(56) References Cited

U.S. PATENT DOCUMENTS

| | | | |
|---|---|---|---|
| 2004/0015506 A1 | 1/2004 | Anonsen et al. | |
| 2007/0214171 A1* | 9/2007 | Behnen | G06F 8/60 |
| | | | 707/999.102 |

(Continued)

OTHER PUBLICATIONS

PCT International Search Report and Written Opinion, PCT Application No. PCT/US2022/020378, dated Jul. 18, 2022, 8 pages.

(Continued)

*Primary Examiner* — Alex Gofman
*Assistant Examiner* — Umar Mian
(74) *Attorney, Agent, or Firm* — Fenwick & West LLP

(57) ABSTRACT

A system for dataflow graph processing comprises a communication interface and a processor. The communication interface is configured receive an indication to generate a dataflow graph, wherein the indication includes a set of queries and/or commands. The processor is coupled to the communication interface and configured to: determine dependencies of each query in the set of queries on another query; determine a DAG of nodes based at least in part on the dependencies; determine the dataflow graph by determining in-line expressions for tables of the dataflow graph aggregating calculations associated with a subset of dataflow graph nodes designated as view nodes; and provide the dataflow graph.

22 Claims, 12 Drawing Sheets

Related U.S. Application Data

(60) Provisional application No. 63/165,943, filed on Mar. 25, 2021.

(51) Int. Cl.
*G06F 16/22* (2019.01)
*G06F 16/245* (2019.01)

(56) References Cited

U.S. PATENT DOCUMENTS

| | | | |
|---|---|---|---|
| 2008/0092112 A1* | 4/2008 | Jin | G06F 16/2448 |
| | | | 717/106 |
| 2010/0060643 A1 | 3/2010 | Kolipaka et al. | |
| 2011/0066602 A1* | 3/2011 | Studer | G06F 40/226 |
| | | | 707/690 |
| 2011/0228696 A1 | 9/2011 | Agarwal et al. | |
| 2012/0054255 A1 | 3/2012 | Buxbaum et al. | |
| 2012/0059840 A1 | 3/2012 | Reddy et al. | |
| 2012/0158768 A1 | 6/2012 | Lamanna et al. | |
| 2013/0104107 A1* | 4/2013 | De Smet | G06F 11/3636 |
| | | | 717/125 |
| 2014/0304251 A1* | 10/2014 | Bornea | G06F 16/9024 |
| | | | 707/718 |
| 2016/0124836 A1* | 5/2016 | Isman | G06F 8/35 |
| | | | 717/131 |
| 2017/0147709 A1* | 5/2017 | Ganz | H04L 67/10 |
| 2018/0157579 A1 | 6/2018 | Rozenberg et al. | |
| 2018/0246752 A1* | 8/2018 | Bonetta | G06F 16/80 |
| 2019/0227777 A1 | 7/2019 | ChoFleming et al. | |
| 2019/0370407 A1* | 12/2019 | Dickie | G06F 8/443 |
| 2021/0073226 A1 | 3/2021 | Chavan et al. | |

OTHER PUBLICATIONS

United States Office Action, U.S. Appl. No. 17/362,456, dated May 31, 2023, 42 pages.
United States Office Action, U.S. Appl. No. 17/362,450, dated Jun. 22, 2022, 18 pages.

* cited by examiner

DATAFLOW GRAPH PROCESSING

CROSS REFERENCE TO OTHER APPLICATIONS

This application is a continuation application of U.S. patent application Ser. No. 17/362,450, filed on Jun. 29, 2021, which claims priority to U.S. Provisional Patent Application No. 63/165,943 entitled DATAFLOW GRAPH PROCESSING filed on Mar. 25, 2021, all of which are incorporated herein by reference in their entirety for all purposes.

BACKGROUND OF THE INVENTION

Declarative queries and commands enable users of a database to describe what needs to happen to their input data, rather than describing how the operation is to be performed. This simplifies a data engineer's task of decomposing their production ETL (Extract, Transform and Load) pipelines into a series of discrete steps. While each individual query is easy to express and can be optimized automatically, data engineers must still reason about, orchestrate, validate, and tune many disparate queries in order to achieve their goal.

BRIEF DESCRIPTION OF THE DRAWINGS

Various embodiments of the invention are disclosed in the following detailed description and the accompanying drawings.

DETAILED DESCRIPTION

Figure 1:
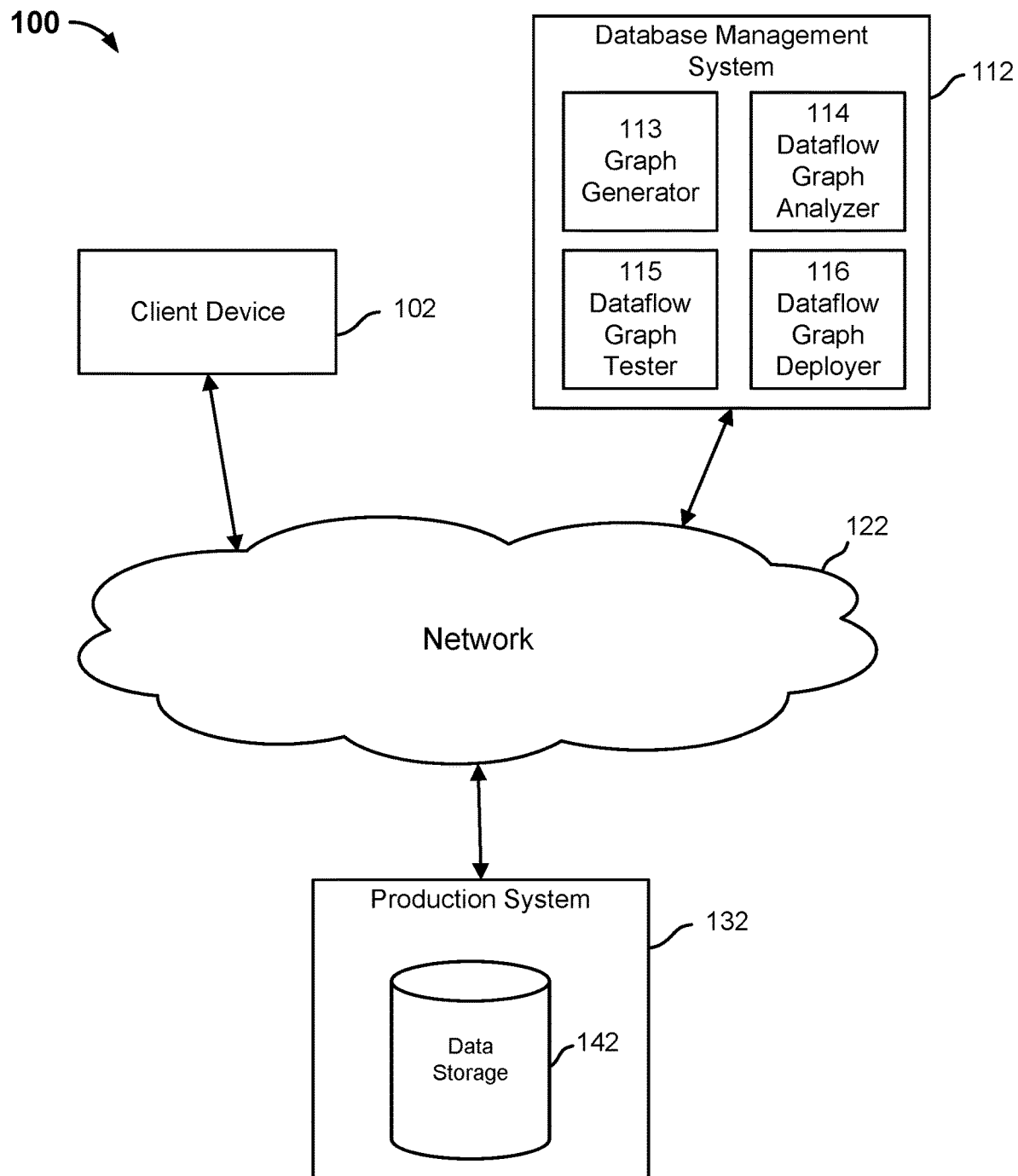
FIG. 1 is a block diagram illustrating a system for implementing dataflow graphs in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for dataflow graph processing is disclosed. The system comprises a communication interface and a processor. The communication interface is configured receive an indication to generate a dataflow graph, wherein the indication includes a set of queries and/or commands. The processor is coupled to the communication interface and configured to: determine dependencies of each query in the set of queries on another query; determine a directed acyclic graph (DAG) of nodes based at least in part on the dependencies; determine the dataflow graph by determining in-line expressions for tables of the dataflow graph aggregating calculations associated with a subset of dataflow graph nodes designated as view nodes; and provide the dataflow graph.

A system for dataflow graph processing is disclosed. The system comprises a communication interface and a processor. The communication interface is configured receive an indication to generate a dataflow graph, wherein the indication includes a set of queries. The processor is coupled to the communication interface and is configured to: determine dependencies of each query in the set of queries on another query; determine a DAG of nodes based at least in part on the dependencies; insert a node in the DAG of nodes to generate an updated DAG to enforce an expectation; determine a dataflow graph based on the updated DAG; and provide the dataflow graph.

A user may provide to a database management system a set of queries and/or commands to perform with respect to a set of data. Each time the user wants to perform the series of queries and commands to the set of data or a different set of data, the user must manually enter to the database management system the set of queries and/or commands. The order in which the queries and commands are performed is important because there may be dependencies between the queries and commands. For example, a query may read data from a column of a table that does not exist. A command may cause the column to be added to the table. In this example, the query must be performed after the command transforms the table. The database management system will be unable to perform the set of queries and/or commands in the event they are provided to the database management system in an incorrect order.

Using the techniques disclosed herein, a database management system is configured to model dependencies between the set of queries and/or commands to generate a dataflow graph. This enables the database management system to perform the set of queries and/or commands in the correct order without a user specifying the correct order. The dataflow graph is a representation of how data is going to flow in the set of queries and/or commands. Tables associated with the set of queries and/or commands do not need to be materialized. Instead, the database management system is configured to generate an in-memory dataflow graph using one or more computing devices (e.g., servers, computers, etc.). This reduces the amount of time and system resources (e.g., processing resources, storage resources, network resources, etc.) needed by the database management system to determine the dependencies of the set of queries and/or commands and whether there are any errors associated with the set of queries and/or commands.

The dataflow graph is comprised of a plurality of flows that read data from one or more inputs, transform the data using relational or functional operations, and write the results to destination. Inputs to a flow can either be a table (e.g., a delta table, a database table, etc.) or other source. A flow can write its output to a sink (e.g., a function that takes a two-dimensional labeled data structure (DataFrame) and writes it to an external system) or a table (e.g., a delta table, a database table, etc.). A sink is used to write the results of a flow to an external system (e.g., a warehouse directory). An intermediate node of the dataflow graph comprises a table (e.g., a delta table, a database table, etc.) and can act as either a source or a sink for a streaming query.

The dependencies between different sources needed to perform the set of queries and/or commands are not specified by a user (e.g., a first table reads data from a second table; the second table needs to be computed before the first table is computed). The dataflow graph generator is configured to generate the dataflow graph in part by identifying one or more data sources that do not depend from other inputs, determining one or more flows that depend from the one or more identified data sources, and updating the dataflow graph to indicate an input-flow-output relationship. The dataflow graph is further generated in part by identifying one or more flows that depend from the one or more determined flows and updating the dataflow graph to indicate an input-flow-output relationship. This process repeats until the dataflow graph represents how data is going to flow in the set of queries and/or commands. The system improves the computer by enabling efficient dataflow processing using dataflow graphs and their automatic generation.

The database management system includes a dataflow graph analyzer. The dataflow graph generator is configured to provide the generated dataflow graph to the dataflow graph analyzer. The dataflow graph analyzer is configured to verify the generated dataflow graph by determining whether there are any errors associated with the generated dataflow graph. For example, a query included in set of queries and/or commands may reference a column that does not exist in a table associated with a source. The dataflow graph analyzer is configured to identify, if any, one or more errors associated with the set of queries and/or commands. The dataflow graph analyzer is configured to provide a report to a user. The report may indicate whether the generated dataflow graph is verified as being error free or not verified if there are any errors associated with the set of queries and/or commands. The report may specify if an error is associated with a particular table or view. The dataflow graph analyzer is able to generate the report without having to materialize the tables associated with the set of queries and/or commands. This significantly reduces the amount of time and resources needed by the database management system to determine whether there are any problems associated with the generated dataflow graph.

In response to receiving a report indicating that the generated dataflow graph is not verified, a user may adjust the set of queries and/or commands or adjust tables associated with the set of queries and/or commands. The user may provide the adjusted set of queries and/or commands to the database management system. In response, the database management system is configured to repeat the above process of generating a dataflow graph and analyzing the generated dataflow graph.

The database management system includes a dataflow graph tester. Although the set of queries and/commands associated with a verified dataflow graph may be error-free, the data on which the verified dataflow graph operates may not be error-free. For example, the schema associated with data may not match the schema needed to perform a flow. The dataflow graph tester is configured to perform one or more unit tests on a verified dataflow graph. A unit test may be performed on some or all of the nodes associated with the verified dataflow graph. A selection transformation may be applied so that the unit test may be performed on part of the verified dataflow graph. The selection transformation is used to narrow down the graph to only the dependencies of the table being tested. This allows subsequent operations to run more quickly, reducing test time. An interference transformation may be applied when performing a unit test, such that the result that will be checked is computed, without the overhead of running the entire dataflow graph.

A user may specify corresponding expectations for some or all of the nodes associated with a dataflow graph. An expectation indicates one or more properties that data in a table associated with a node is expected to possess. For example, an expectation may be that data in a table is expected to be associated with a timestamp that is greater than the year 2000. Data in the table that has a timestamp that is less than the year 2000 (e.g., 1980) may indicate a problem with data included in the table.

The dataflow graph tester is configured to obtain a sample set of data and store the obtained sample set of data in a storage device associated with the database management system (e.g., solid-state drive, hard disk drive, RAID, etc.). In some embodiments, the sample set of data is manually generated. In some embodiments, the sample set of data is obtained from a storage location storing production data (e.g., cloud storage). A dataflow graph includes one or more nodes corresponding to sources that reference corresponding external storage locations. The dataflow graph tester is configured to modify the verified dataflow graph by substituting a source node that references an external storage location with a source node that references a local storage location of the database management system that stores the obtained sample set of data.

In some embodiments, the dataflow graph tester utilizes the obtained sample set of data to perform a unit test with respect to a selected portion of the verified dataflow graph. In some embodiments, the dataflow graph tester utilizes the obtained sample set of data to infer a corresponding output at each node of the verified dataflow graph.

The dataflow graph tester is configured to traverse the verified dataflow graph, perform a unit test, and enforce, for some or all of the nodes, corresponding expectations associated with the unit test. In some embodiments, an expectation is not met and in response, the dataflow graph tester is configured to perform, based on a severity associated with an expectation, one or more responsive actions, such as aborting the unit test, quarantining a flow output, generating an alert, and/or ignoring the unmet expectation. In the event an expectation associated with a node is met, the dataflow graph tester is configured to traverse the verified dataflow graph to a subsequent node and perform a corresponding unit test with respect to the subsequent node. The dataflow graph tester is configured to traverse the verified dataflow graph until the nodes associated with the unit test have been tested. In the event all expectations associated with the verified dataflow graph have been met, the dataflow graph tester is configured to validate the dataflow graph.

The database management system includes a dataflow graph deployer. After a dataflow graph has been verified and the data on which the dataflow graph is to operate has been validated, the dataflow graph deployer may deploy the dataflow graph to a production system. The dataflow graph deployer may perform one or more pre-deployment checks prior to deploying the dataflow graph. These pre-deployment checks may reduce costs due to failed deployments and limit downtime that would result from pushing bad code. A pre-deployment check may include performing one or more transformations, such as a difference transformation, an inference transformation, a validation transformation, and/or an iteration transformation.

The dataflow graph deployer is configured to materialize the tables associated with the set of queries and/or commands to ensure that the deployed dataflow graph will operate on the correct data set. The dataflow graph deployer is configured to connect the dataflow graph to one or more external sources indicated by one or more source nodes included in the dataflow graph. Subsequently, the dataflow graph deployer is configured to execute the dataflow graph. In some embodiments, the dataflow graph is executed in triggered mode. In triggered mode, the dataflow graph is initiated, the dataflows are performed, and the dataflow graph is shut down after all the dataflows are performed. In some embodiments, the dataflow graph is executed in continuous mode. In continuous mode, the dataflows included in the dataflow graph are continually running and are updated in response to data changes.

FIG. 1 is a block diagram illustrating a system for implementing dataflow graphs in accordance with some embodiments. In the example shown, system 100 includes client device 102, database management system 112, and production system 132. Client device 102, database management system 112, and production system 132 are connected to each other via network 122. Network 122 may be a local area network, a computer network, a wide area network, the Internet, a storage area network, a system-area network, an enterprise private network, a virtual private network, and/or a combination thereof.

Client device 102 may be a server, a personal computer, a laptop, a desktop, a tablet, or any other computing device that is capable of communicating with other computing devices via network 122.

A user associated with client device 102 may declaratively specify to database management system 112 a set of queries and/or commands to perform with respect to a set of data. Database management system 112 is comprised of one or more computing devices (e.g., servers, computers, etc.). Each of the one or more computing devices includes a corresponding processor, a corresponding memory, and a corresponding storage.

The order in which the queries and/or commands are performed is important because there may be dependencies between the queries and/or commands. However, the order is not declaratively specified by the user. Instead, database management system 112 is configured to discover the order in which the set of queries and/or commands are to be performed by modeling dependencies between the set of queries and/or commands in the form of a dataflow graph. This enables database management system 112 to perform the set of queries and/or commands in the correct order without the user associated with client device 102 specifying the correct order.

Database management system 112 does not need to materialize the tables associated with the set of queries and/or commands to generate the dataflow graph. Instead, the database management system is configured to generate an in-memory dataflow graph that represents how data is going to flow in the set of queries and/or commands. Other systems may materialize the tables associated with the set of queries and/or commands. This may take the other systems a long time (e.g., days) to generate a dataflow graph. Generating an in-memory dataflow graph without materializing the tables associated with the set of queries and/or commands reduces the amount of time and system resources (e.g., processing resources, storage resources, network resources, etc.) needed by database management system 112 to determine the dependencies of the set of queries and/or commands and whether there are any errors associated with the set of queries and/or commands.

Dataflow graph generator 113 is configured to generate a dataflow graph based on a set of queries and/or commands provided by a user associated with client device 102. The dataflow graph is comprised of a plurality of flows that read data from one or more inputs, transform the data using relational or functional operations, and write the results to destination. Inputs to a flow can either be a source or a table. A flow can write its output to a sink (e.g., a function that takes a two-dimensional labeled data structure (DataFrame) and writes it to an external system) or a table. A sink is used to write the results of a flow to an external system (e.g., warehouse directory). A table can act as a source or a sink for a streaming query.

The dependencies between different sources needed to perform the set of queries and/or commands are not specified by a user. Graph generator 113 is configured to generate the dataflow graph in part by identifying one or more data sources that do not depend from other inputs, determining one or more flows that depend from the one or more identified data sources, and updating the dataflow graph to indicate an input-flow-output relationship. Graph generator 113 is configured to further generate the dataflow graph in part by identifying one or more flows that depend from the one or more determined flows and updating the dataflow graph to indicate an input-flow-output relationship. This process repeats until the dataflow graph represents how data is going to flow in the set of queries and/or commands.

Database management system 112 includes dataflow graph analyzer 114. Graph generator 113 is configured to provide the generated dataflow graph to dataflow graph analyzer 114. Dataflow graph analyzer 114 is configured to verify the generated dataflow graph by determining whether there are any errors associated with the generated dataflow graph. For example, a query included in set of queries and/or commands may reference a column that does not exist in a table associated with a source. Dataflow graph analyzer 114 is configured to identify, if any, one or more errors associated with the set of queries and/or commands. Dataflow graph analyzer 114 is configured to provide a report to a user. The report may indicate whether the generated dataflow graph is verified as being error free or not verified if there are any errors associated with the set of queries and/or commands. The report may specify if an error is associated with a particular table or view.

Dataflow graph analyzer 114 is able to generate the report without having to materialize the tables associated with the set of queries and/or commands. Other systems may materialize the tables associated with the set of queries and/or commands to determine if there are any errors associated with a generated dataflow graph. Analyzing an in-memory dataflow graph without materializing the tables associated with the set of queries and/or commands reduces the amount of time and system resources (e.g., processing resources, storage resources, network resources, etc.) needed by database management system 112 to determine whether there are any problems associated with the generated dataflow graph.

In response to receiving a report indicating that the generated dataflow graph is not verified, a user associated with client device 102 may adjust the set of queries and/or commands or adjust tables associated with the set of queries and/or commands. The user associated with client device 102 may provide the adjusted set of queries and/or commands to database management system 112. In response, database management system 112 is configured to repeat the process of generating a dataflow graph and analyzing the generated dataflow graph.

Database management system 112 includes dataflow graph tester 115. Although the set of queries and/commands associated with a verified dataflow graph may be error-free, the data on which the verified dataflow graph operates may not be error-free. For example, the schema associated with data may not match the schema needed to perform a flow. Dataflow graph tester 115 is configured to perform one or more unit tests on the verified dataflow graph. A unit test may be performed on some or all of the nodes associated with a dataflow graph. A selection transformation may be applied so that the unit test may be performed on part of the dataflow graph. The selection transformation is used to narrow down the graph to only the dependencies of the table being tested. This allows subsequent operations to run more quickly, reducing test time. An interference transformation may be applied when performing a unit test, such that the result that will be checked is computed, without the overhead of running the entire dataflow graph.

A user associated with client device 102 may specify corresponding expectations for some or all of the nodes associated with the dataflow graph. An expectation indicates one or more properties that data in a table associated with a node is expected to possess. For example, an expectation may be that data in a table is expected to be associated with a timestamp that is greater than the year 2000. Data in the table that has a timestamp that is less than the year 2000 (e.g., 1980) may indicate a problem with data included in the table.

Dataflow graph tester 112 is configured to obtain a sample set of data and store the obtained sample set of data in a storage device associated with database management system 112 (e.g., solid-state drive, hard disk drive, RAID, etc.). In some embodiments, the sample set of data is manually generated. In some embodiments, the sample set of data is obtained from data storage 142. In some embodiments, data storage 142 is located in a datacenter hosting production system 132. In some embodiments, data storage 142 is located in a computing cluster. In some embodiments, data storage 142 is located in a cloud storage (e.g., Amazon Web Services®, Microsoft Azure®, Google Cloud®, etc.). The dataflow graph includes one or more nodes corresponding to sources that reference corresponding external storage locations (e.g., data stored in data storage 142). The dataflow graph tester is configured to modify the dataflow graph by substituting a source node that references an external storage location with a source node that references a local storage location of database management system 112 that stores the obtained sample set of data.

In some embodiments, dataflow graph tester 115 utilizes the obtained sample set of data to perform a unit test with respect to a selected portion of the dataflow graph. In some embodiments, dataflow graph tester 115 utilizes the obtained sample set of data to infer a corresponding output at each node of the dataflow graph.

Dataflow graph tester 115 is configured to traverse the verified dataflow graph, perform a unit test, and enforce, for some or all of the nodes, corresponding expectations associated with the unit test. In some embodiments, an expectation is not met and in response, dataflow graph tester 115 is configured to perform, based on a severity associated with an expectation, one or more responsive actions, such as aborting the unit test, quarantining a flow output, generating an alert, and/or ignoring the unmet expectation. In the event an expectation associated with a node is met, dataflow graph tester 115 is configured to traverse the verified dataflow graph to a subsequent node and perform a corresponding unit test with respect to the subsequent node. Dataflow graph tester is configured to traverse the verified dataflow graph until the nodes associated with the unit test have been tested. In the event all expectations associated with the verified dataflow graph have been met, dataflow graph tester 115 is configured to validate the dataflow graph.

Database management system 112 includes dataflow graph deployer 116. After a dataflow graph has been verified and the data on which the dataflow graph is to operate has been validated, dataflow graph deployer 116 may deploy the dataflow graph to production system 132. The code associated with a dataflow graph may be stored in a database notebook or a file, such as a JAR (Java Archive file) file.

Dataflow graph deployer 116 may perform one or more pre-deployment checks prior to deploying the dataflow graph. These pre-deployment checks may reduce costs due to failed deployments and limit downtime that would result from pushing bad code. A pre-deployment check may include performing one or more transformations, such as a difference transformation, an inference transformation, a validation transformation, and/or an iteration transformation.

Dataflow graph deployer 116 is configured to materialize the tables associated with the set of queries and/or commands are materialized to ensure that the deployed dataflow graph will operate on the correct data set. Dataflow graph deployer 116 is configured to connect the dataflow graph to one or more external sources indicated by one or more source nodes included in the dataflow graph. Subsequently, dataflow graph deployer 116 is configured to execute the dataflow graph. In some embodiments, the dataflow graph is executed in triggered mode. In triggered mode, the dataflow graph is initiated, the dataflows are performed, and the dataflow graph is shut down after all the dataflows are performed. In some embodiments, the dataflow graph is executed in continuous mode. In continuous mode, the dataflows included in the dataflow graph are continually running and are updated in response to data changes.

Figure 2:
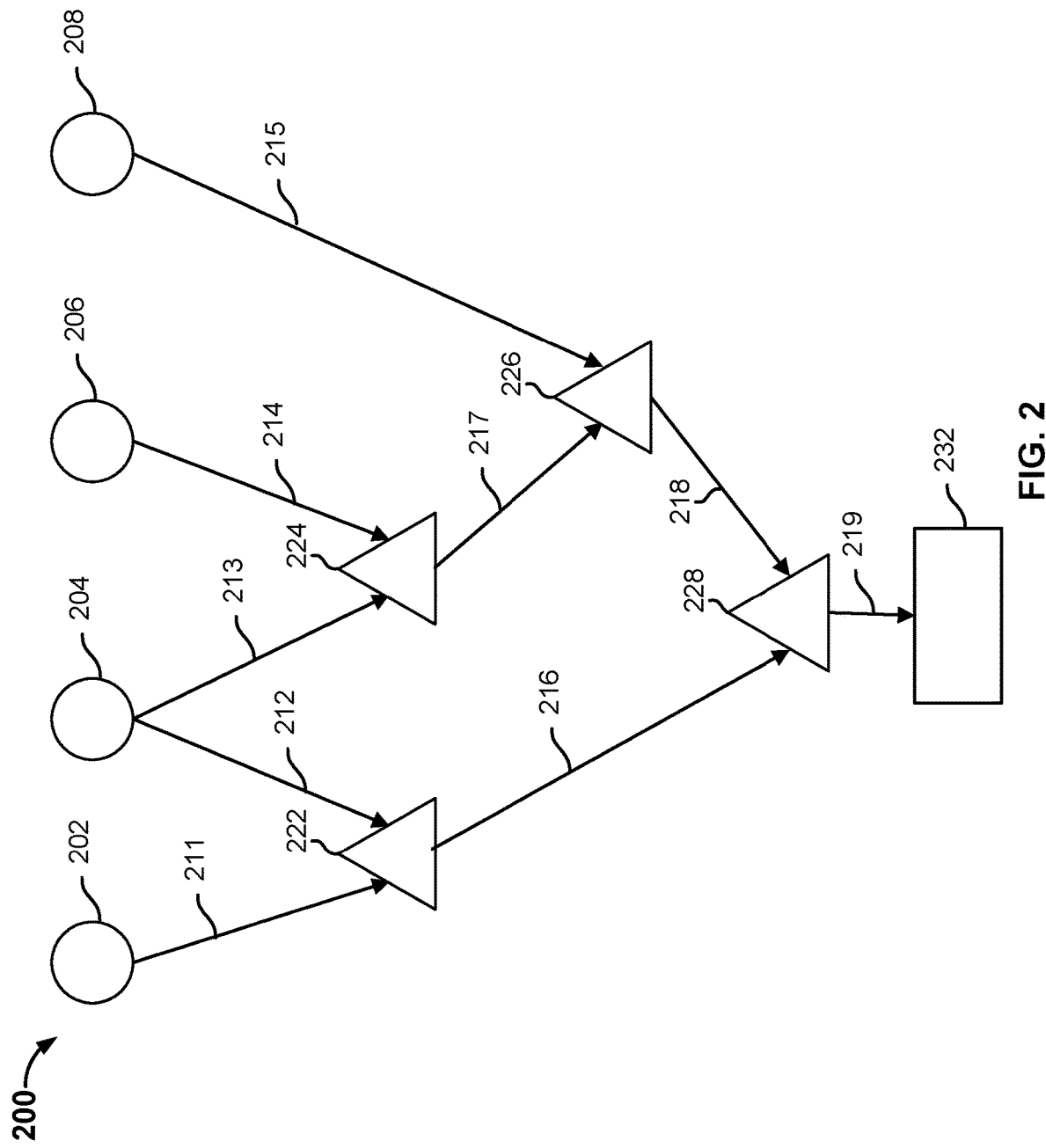
FIG. 2 is a diagram illustrating an example of a dataflow graph.

FIG. 2 is a diagram illustrating an example of a dataflow graph. In the example shown, dataflow graph 200 may be generated by a dataflow graph generator, such as dataflow graph generator 113.

Dataflow graph 200 is generated based on a declarative set of queries and/or commands. A user may specify what needs to happen to their input data, rather than describing how the operation is to be performed. Dataflow graph 200 is an example representation of how data is going to flow in the set of queries and/or commands.

Dataflow graph 200 includes source nodes 202, 204, 206, 208. A source is a node in the graph that represents data read from a storage system external to the graph (e.g., data storage 142 of FIG. 1). A source may be expressed as a named function that returns a two-dimensional labeled data structure (e.g., DataFrame). For example, the following code creates an input named "raw" that continually reads json data from a file system:

addSource("raw", spark.readStream.json("/data/raw"))

Dataflow graph 200 includes flows 211, 212, 213, 214, 215, 216, 217, 218, 219. A flow reads data from one or more inputs, transforms the data using relational or functional operations, and writes the results to a destination. For example, the following code parses a timestamp from the unix time format and writes the result to a destination named "warehouse":

addFlow(
        name="parse-raw-data",
        func=input("raw").withColumn("timestamp", from_unix_time("timestamp"), destination "warehouse")

A flow may perform one or more transformations on data read from one or more inputs. The one or more transformations may include a selection transformation, a substitution transformation, an inference transformation, an enforcement transformation, a redirection transformation, an observation transformation, a difference transformation, a translation transformation (e.g., transform the graph into a different format), and/or a user defined transformation.

Dataflow graph 200 includes datasets 222, 224, 226, and 228. The system enables both to streaming and batch computation. Dataflow graph 200 describes a computation flow that can be executed as either a streaming or a batch type computation. Some datasets of dataflow graph 200 are views (not materialized) and some are tables (materialized). In various embodiments, datasets are implemented using tables (e.g., a delta table, a database table, etc.) that allow easy management of data including storage of large amounts of data (e.g., petabytes of data), storing data as "commits," indexing data, etc. In some embodiments, the tables comprise delta tables, which enable data skipping, clustering, z-ordering, efficient streaming, etc.

In some embodiments, a table enables users to recompute sections of the dataflow graph "from the beginning of time," that is, the point in time at which data began to be stored in the table. Changes to the delta table are stored as ordered atomic units called commits. In some embodiments, a table maintains indexes of the ingested data. This reduces the amount of time needed to perform a query.

In some embodiments, a dataset (e.g., as implemented using a table, a delta table, etc.) or other source is configured to allow ad-hoc queries to be performed because it has an optimized physical layout coupled with data skipping and limit optimizations. In some embodiments, data skipping is possible because a delta table maintains file statistics so that data subsets relevant to a query are used instead of entire tables. This partitioning pruning avoids processing data that is not relevant to the query. Multi-dimensional clustering (using Z-ordering algorithm) is used to enable this. Since a table can be used as an efficient source for further streaming computation, it may be used as a natural fan-out point when there are intermediate results that can be used by multiple downstream computations. For example, datasets 222, 224, 226, 228 are used for downstream computations. A table coupled with DBIO (database input output) caching, querying a table can be significantly more efficient than reading data from the original source multiple times. In some embodiments, a table is cloned by copying a snapshot of a transaction log. A table is configured to handle both multiple input streams of data and batch updates. A schema may be inferred from the input data.

A table may manage file sizes to speed up query performance. For example, a delta table may combine or compact multiple small files (e.g., a file smaller than a threshold size) into more efficient larger ones).

Accessing data from storage repeatedly can slow query performance. Tables may automatically cache highly accessed data to speed access for queries improving performance by an order of magnitude.

A common issue in streaming a pipeline is "unexpected" records that are incorrectly processed. One solution to this issue is to have a developer deploy a new version that correctly handles these records; however, this does not fix the fact that incorrectly processed data has already been pushed downstream. Graph fragments that are composed entirely of tables and replayable sources can be "rolled-back" allowing data to be reprocessed using corrected logic.

In some embodiments, a user forces permanent materialization of a table. The user can control metadata associated with the table, such as metastore name, partitioning, ZORDERING, description, location, schema, properties, and/or retention.

The metastore name is an optional database and table name that can be given to a table to make it accessible from a hive metastore. Partitioning metadata controls how the data in a table is to be partitioned. ZORDERING metadata associated with a table controls the layout when the table is optimized to improve performance of queries. Description metadata is a human readable description of what is stored in a table. Location metadata allows a user to manually specify a location, such as a location in cloud storage, where the table will be stored. Schema metadata allows a user to specify the exact schema of a table, rather than relying on inference of the flows that are writing to it.

A user can specify a variety of table properties, such as how the table should be laid out physically, how long to retain stale snapshots (i.e., the vacuum retention interval), and whether or not flows should be allowed to automatically add columns to a table. These properties can be specified along with the code that writes into the table, creating a single source of truth.

Retention metadata allows a user to write policies on how long data will be retained before being purged from the system, likely for compliance or cost reasons.

Dataflow graph 200 includes sink 232. A sink is used to write the results of a flow to an external system. For example, the following code creates a parquet encoded directory that can be queried by a database management system or other external system:

addSink(
        name="warehouse",
        mode="complete", (df: DataFrame)=>df.writeStream.format("csv")
.saveAsTable("warehouse"))

In the example shown, flow 211 transforms data associated with source 202 and writes the results to dataset 222, flow 212 transforms data associated with source 204 and writes the results to dataset 222, flow 213 transforms data associated with source 204 and writes the results to dataset 224, flow 214 transforms data associated with source 206 and writes the results to dataset 224, and flow 215 transforms data associated with source 208 and writes the results to dataset 226.

Flow 216 transforms data associated with dataset 222 and outputs the results to dataset 228. Flow 216 is dependent upon flows 211, 212 because flow 216 is unable to output its results to dataset 228 until both flow 211 and flow 212 output their corresponding results to dataset 222. Flow 217 transforms data associated with table 224 and outputs the results to dataset 226. Flow 217 is dependent upon flows 213, 214 because flow 217 is unable to output its results to dataset 226 until both flow 213 and flow 214 output their corresponding results to dataset 224. Flow 219 transforms data associated with dataset 228 and writes the results to sink 232. Flow 219 is dependent upon flows 216, 218 because flow 219 is unable to output its results to sink 232 until both flow 216 and flow 218 output their corresponding results to dataset 228. These dependencies are not specified by a user. Rather, a dataflow graph generator analyzes a set of queries and/or commands to discover the dependency and generate a dataflow graph to reflect the discovered dependency.

Figure 3A:
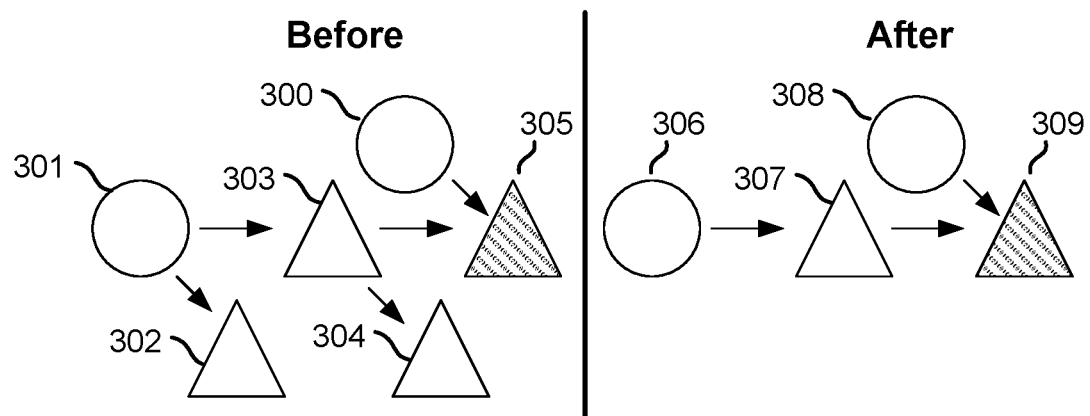
FIGS. 3A-3G illustrate examples of transformations in accordance with some embodiments.

FIG. 3A illustrates an example of a selection transformation in accordance with some embodiments. In the example shown, a sub-graph is generated by applying criteria to the plurality of nodes. In the before dataflow graph, data enters at source 301 and flows to dataset 302 and dataset 303. Data flows from dataset 303 to dataset 304 and dataset 305. Source node 300 also enables entry of data that flows to dataset 305. In the after dataflow graph, data enters at source node 306 and flows to dataset 307. Data flows from dataset 307 to dataset 309. Source node 308 also enables entry of data that flows to dataset 309. Note that dataset 302 and dataset 304 have been filtered out of the graph to create a sub-graph because they do not meet the applied criteria. In some embodiments, a label or tag may be associated with a node. A sub-graph may be generated based on nodes having a particular label or a particular tag.

Figure 3B:
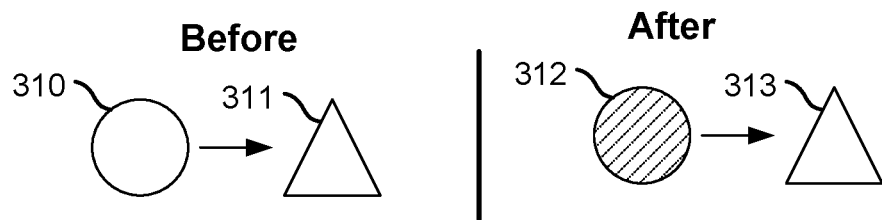

FIG. 3B illustrates an example of a substitution transformation in accordance with some embodiments. In the example shown in the before dataflow graph, data enters at source node 310 and flows to dataset 311. In the after dataflow graph, data enters at source node 312 and flows to dataset 313. The processing described by the flow from source node 310 to dataset 311 is the same as the processing described by the flow from source node 312 to dataset 313. However, a source node 310 is substituted with source node 312. This creates a new graph where an input associated with source node 310 has been replaced with an input associated with source node 312. A substitution transformation is used when testing a dataflow graph. For example, source 312 comprises a test data set (e.g., a smaller data set) as compared to source 310.

Figure 3C:
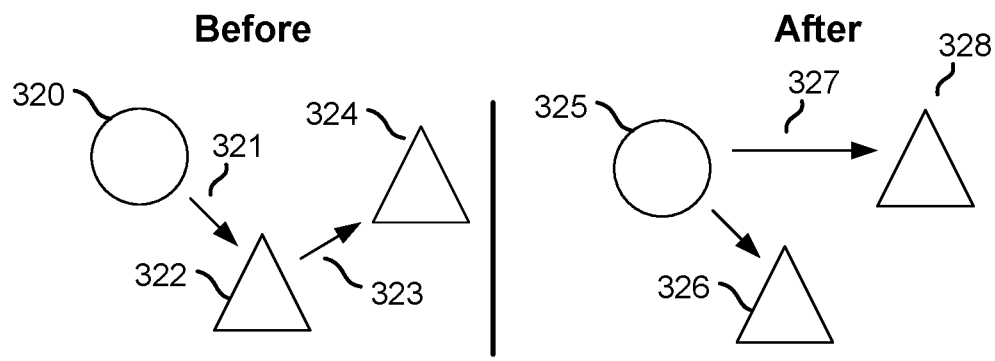

FIG. 3C illustrates an example of an inference transformation in accordance with some embodiments. In the example shown in the before dataflow graph, data enters at source node 320, flows to dataset 322, and then flows to dataset 324. In the after dataflow graph, the graph is transformed to compute final datasets in one step. For example, data enters at source node 325, flows to dataset 326, and also flows to dataset 328. In the example shown, the after dataflow the processing for dataflow 327 includes the processing for both dataflow 321 and dataflow 323 that is described in line in dataset 328. An inference transformation constructs the complete lineage to compute what the output will be at each node in the dataflow graph, skipping any intermediate materialization points (e.g., a view as opposed to a materialized table). In effect, the inference transformation "fuses" all of the logical query plans of each flow into a single two-dimensional labeled data structure (e.g., DataFrame). The inference transformation enables the result that would appear at a table to be computed, without executing all the streams normally required. The computed result from each table is merged from data of all dataflows writing to that table.

Figure 3D:
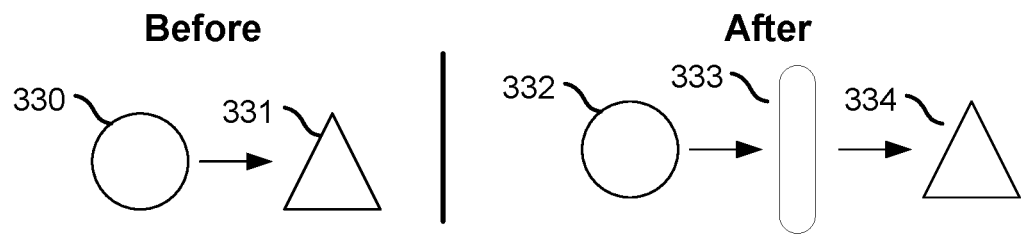

FIG. 3D illustrates an example of an enforcement transformation in accordance with some embodiments. In the example shown, in the before dataflow source node 330 data flows to dataset 331. In the after dataflow, source node 332 data flows to enforcement node 333 prior to flowing to dataset 334. For example, enforcement node 333 may halt execution of the dataflow graph when any tuple associated with a table is encountered that does not match a given predicate. As specific examples, enforcement node 333 halts execution of the dataflow graph when a data (e.g., a tuple) is negative, when a date data is in the future, when a data is greater than a threshold, is less than a threshold, etc.

In various embodiments, an enforcement transformation redirects or flows through instead of just halting execution. For example, data matching a predicate condition is counted, is quarantined, is flagged, is tagged, processed in a different manner, or any other appropriate processing is performed.

Figure 3E:
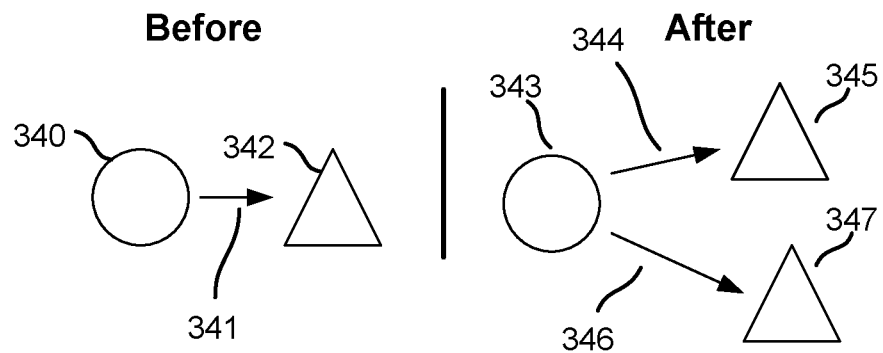

FIG. 3E illustrates an example of a redirection transformation in accordance with some embodiments. In the example shown, in the before dataflow source node 340 data flows along arrow 341 to dataset 342. In the after dataflow, source node 343 data flows along arrow 345 or arrow 347 depending on a predicate. For example, based on a condition data flows either to dataset 346 with a first set of processing along arrow 345 or to dataset 348 with a second set of processing along arrow 347.

Figure 3F:
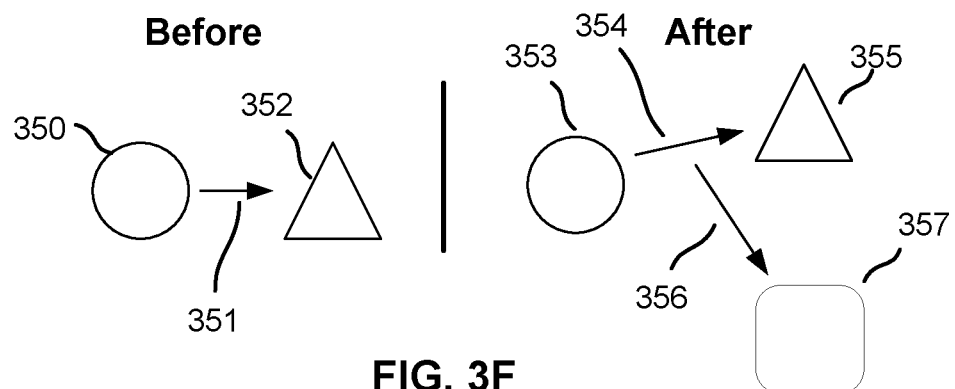

FIG. 3F illustrates an example of an observation transformation in accordance with some embodiments. In the example shown, in the before dataflow source node 350 data flows along arrow 351 to dataset 352. In the after dataflow, source node 353 data flows along arrow 354 to dataset 355. The observation transformation modifies flow 354 to include an additional flow 356 that writes its output to sink 357. The additional flow 356 aggregates information that can be observed from flow 354 to sink 357.

Figure 3G:
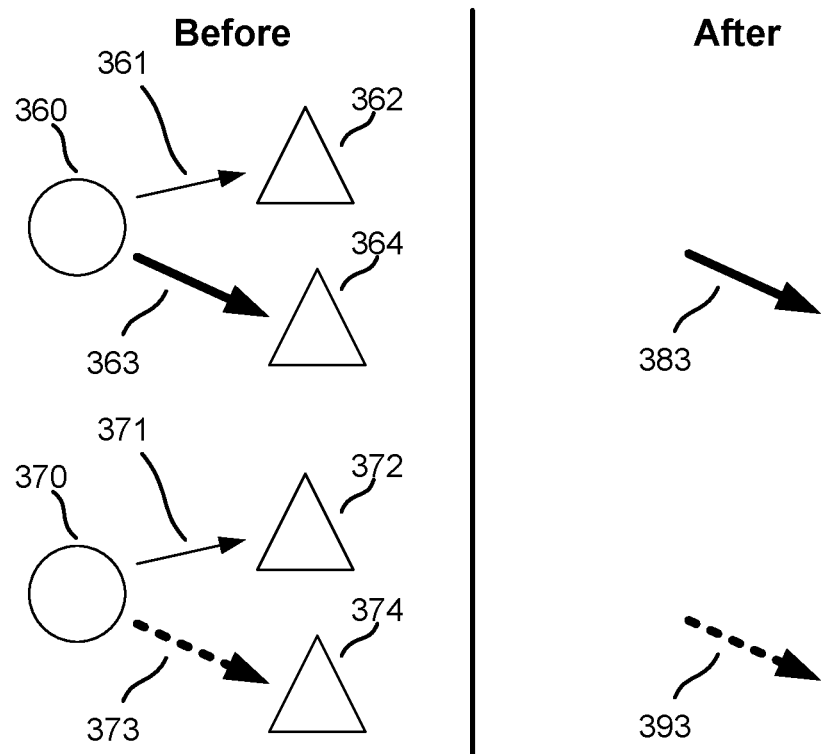

FIG. 3G illustrates an example of a difference transformation in accordance with some embodiments. In the example shown, in the before dataflow source node 360 data flows along arrow 361 to dataset 362 and along arrow 363 to dataet 364. Also, source node 370 data flows along arrow 371 to dataset 372 and along arrow 373 to dataset 374. Given the two dataflow graphs in the before side, a difference transformation is configured to return components that are either not present in both, or have the same name but different configurations in each. In the example shown, the difference transformation indicates that dataflows 383 and 393 corresponding to 363 and 373 respectively are not present in both dataflow graphs or have the same name but different configurations.

Figure 4:
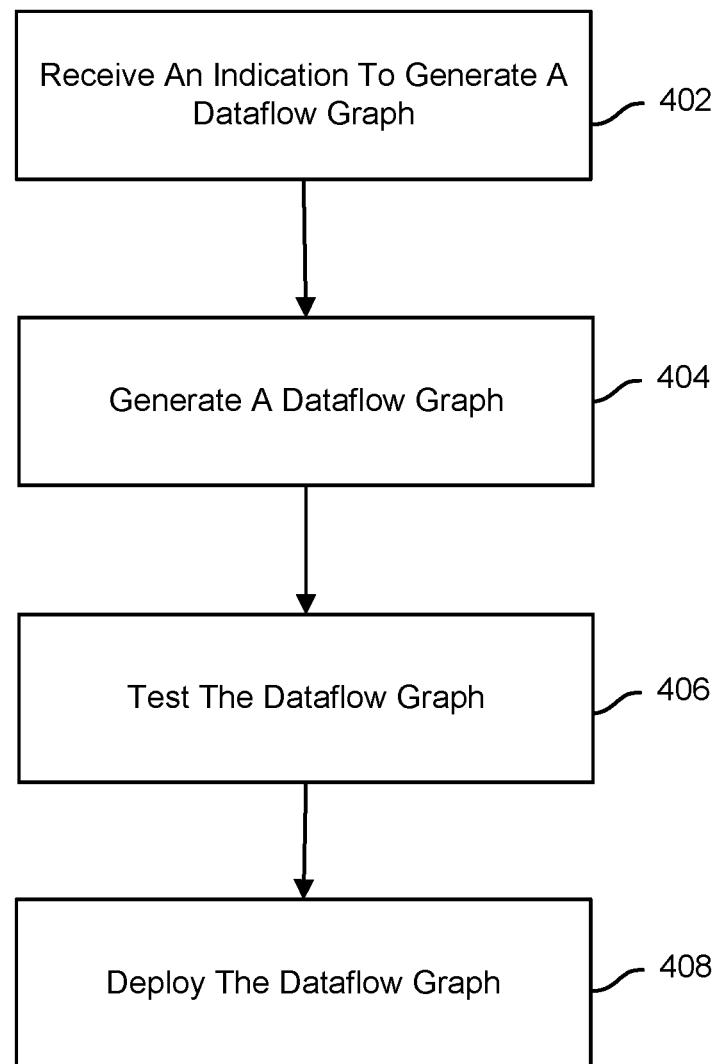
FIG. 4 is a flow diagram illustrating a process for deploying a dataflow graph in accordance with some embodiments.

FIG. 4 is a flow diagram illustrating a process for deploying a dataflow graph in accordance with some embodiments.

In the example shown, process 400 may be implemented by a database management system, such as database management system 112.

At 402, an indication to generate a dataflow graph is received. A user may declaratively specify, via a client device, a set of queries and/or commands and provide the set of queries and/or commands to a database management system. The set of queries and/or commands may indicate one or more sources of data and a sink for the output data associated with the set of queries and/or commands. The set of queries and/or commands specify what needs to happen to the user's data, rather than describing how the operation is to be performed.

At 404, a dataflow graph is generated based on the set of queries and/or commands. The order in which the queries and commands are performed is important because there may be dependencies between the queries and commands. However, the underlying dependencies between the queries and/or commands are not specified by the user. The database management system will be unable to perform the set of queries and/or commands in the event they are provided to the database management system in an incorrect order.

A database management system is configured to model dependencies between the set of queries and/or commands by generating a dataflow graph. This enables the database management system to perform the set of queries and/or commands in the correct order without a user specifying the correct order. The dataflow graph is a representation of how data is going to flow in the set of queries and/or commands. Tables associated with the set of queries and/or commands are not materialized. Instead, the database management system is configured to generate an in-memory dataflow graph using one or more computing devices (e.g., servers, computers, etc.). This reduces the amount of time and system resources (e.g., processing resources, storage resources, network resources, etc.) needed by the database management system to determine the dependencies of the set of queries and/or commands and whether there are any errors associated with the set of queries and/or commands.

The dataflow graph is comprised of a plurality of flows that read data from one or more inputs, transform the data using relational or functional operations, and write the results to destination. Inputs to a flow can either be a table or other source. A flow can write its output to a sink or a table. A sink is used to write the results of a flow to an external system (e.g., warehouse directory). A table can act as a source or a sink for a streaming query.

The dataflow graph is generated in part by identifying one or more data sources that do not depend from one or more other inputs, determining one or more flows that depend from the one or more identified data sources, and updating the dataflow graph to indicate an input-flow-output relationship. The dataflow graph is further generated in part by identifying one or more flows that depend from the one or more determined flows and updating the dataflow graph to indicate an input-flow-output relationship. This process repeats until the dataflow graph represents how data is going to flow in the set of queries and/or commands.

After the dataflow graph is generated, the dataflow graph is verified by determining whether there are any errors associated with the generated dataflow graph. For example, a query included in set of queries and/or commands may reference a column that does not exist in a table associated with a source. A dataflow graph analyzer is configured to identify, if any, one or more errors associated with the set of queries and/or commands. The dataflow graph analyzer is configured to generate and provide a report to a user. The report may indicate whether the generated dataflow graph is verified as being error free or not verified if there are any errors associated with the set of queries and/or commands. The report may specify if an error is associated with a particular table or view. The dataflow graph analyzer is able to generate the report without having to materialize the tables associated with the set of queries and/or commands. This significantly reduces the amount of time and resources needed by the database management system to determine whether there are any problems associated with the generated dataflow graph.

At 406, the dataflow graph is tested using a sample set of data. Although the set of queries and/commands associated with a verified dataflow graph may be error-free, the data on which the verified dataflow graph operates may not be error-free. For example, the schema associated with data may not match the schema needed to perform a flow. A dataflow graph tester is configured to perform one or more unit tests on the verified dataflow graph. A unit test may be performed on some or all of the nodes associated with the dataflow graph.

A user may specify corresponding expectations for some or all of the nodes associated with the dataflow graph. An expectation indicates one or more properties that data in a table associated with a node is expected to possess. For example, an expectation may be that data in a table is expected to be associated with a timestamp that is greater than the year 2000. Data in the table that has a timestamp that is less than the year 2000 (e.g., 1980) may indicate a problem with data included in the table.

The dataflow graph tester is configured to obtain a sample set of data and store the obtained sample set of data in a storage device associated with the database management system (e.g., solid-state drive, hard disk drive, RAID, etc.). In some embodiments, the sample set of data is manually generated. In some embodiments, the sample set of data is obtained from a storage location storing production data (e.g., cloud storage). The verified dataflow graph includes one or more nodes corresponding to sources that reference corresponding external storage locations. The dataflow graph tester is configured to modify the dataflow graph by substituting a source node that references an external storage location with a source node that references a local storage location of the database management system that stores the obtained sample set of data.

In some embodiments, the dataflow graph tester utilizes the obtained sample set of data to perform a unit test with respect to a selected portion of the verified dataflow graph. In some embodiments, the dataflow graph tester utilizes the obtained sample set of data to infer a corresponding output at each node of the verified dataflow graph.

The dataflow graph tester is configured to traverse the verified dataflow graph, perform a unit test and enforce, for some or all of the nodes, corresponding expectations associated with the unit test. In some embodiments, an expectation is not met and in response, the dataflow graph tester is configured to perform, based on a severity associated with an expectation, one or more responsive actions, such as aborting the unit test, quarantining a flow output, generating an alert, and/or ignoring the unmet expectation. In the event an expectation associated with a node is met, the dataflow graph tester is configured to traverse the verified dataflow graph to a subsequent node and perform a corresponding unit test with respect to the subsequent node. The dataflow graph tester is configured to traverse the verified dataflow graph until the nodes associated with the unit test have been tested. In the event all expectations associated with the verified dataflow graph have been met, the dataflow graph tester is configured to validate the dataflow graph.

At 408, the dataflow graph is deployed. The database management system includes a dataflow graph deployer. After a dataflow graph has been verified and the data on which the dataflow graph is to operate has been validated, the dataflow graph deployer may deploy the dataflow graph to a production system. The code associated with a dataflow graph may be stored in a database notebook or a file, such as a JAR (Java Archive file) file.

The dataflow graph deployer may perform one or more pre-deployment checks prior to deploying the dataflow graph. These pre-deployment checks may reduce costs due to failed deployments and limit downtime that would result from pushing bad code. A pre-deployment check may include performing one or more transformations, such as a difference transformation, an inference transformation, a validation transformation, and/or an iteration transformation.

A difference transformation for a pre-deployment check may be used to show a user the difference(s) between what is already deployed and what is to be deployed, allowing the user to catch any unexpected changes before deployment happens. An inference transformation for a pre-deployment check may be used to calculate the required schema at any table where it has not been explicitly specified. A validation transformation for a pre-deployment check may assert that allow flows can be properly analyzed and that the schema of each flow is compatible with any existing persistent state. An iteration transformation for a pre-deployment check may iterate over the inferred schema of every table in the dataflow graph and issue DDL (data definition language) to construct that table before any flows have started.

After the one or more pre-deployment checks are performed, one or more APIs may be called to begin data processing. As part of data processing, the dataflow graph deployer may ensure that expectations are being satisfied and that other maintenance work (e.g., optimize, vacuum) is being performed by implementing one or more transformations, such as an enforcement transformation, a redirection transformation, an observation transformation, and/or an iteration transformation. An enforcement transformation in a deployment environment enables any flow that encounters a tuple that causes a violation of a fatal expectation to be failed. A redirection transformation in a deployment environment enables a flow to be bifurcated for tuples that fail to meet expectations. Such tuples are routed to a quarantine table. An observation transformation in a deployment environment can be used to report how many tuples are not meeting expectations where the user has been asked to be notified based on a threshold. An iteration transformation in a deployment environment can be used after flows have been modified to ensure expectations are met. The whole graph can be iterated over to discover flows and call the appropriate APIs to start stream execution. An iteration transformation in a deployment environment can also be used to iterate over any tables in the dataflow graph at a regular schedule to execute maintenance operations, such as optimize and vacuum. An optimize maintenance operation optimizes a layout of data in a table. A vacuum maintenance operation removes data files that are no longer in the latest state of the transaction log for the table and are older than a retention threshold.

In some embodiments, the deployment environment is a canary (staging) environment, which operates on realistic data (e.g., yesterday's data), but without affecting the actual production deployment. A canary deployment may add one or more transformations, such as a difference transformation, a selection transformation, a substitution transformation, an enforcement transformation, and/or an iteration transformation, to the dataflow graph.

A difference transformation in a canary deployment computes what has changed between the canary environment and the production environment. A selection transformation in a canary deployment removes parts of the dataflow graph that are unchanged to reduce the cost of executing the staging version of the pipeline. A substitution transformation in a canary deployment inserts actual data into the pipeline in a way that will not affect production data (e.g., read a sample of yesterday's data from each table). An enforcement transformation in a canary deployment can be used to fail the canary deployment if any expectations are violated. An iteration transformation in a canary deployment may iterate over the inferred schema of every table in the dataflow graph and issue DDL (data definition language) to construct that table before any flows have started.

Figure 5A:
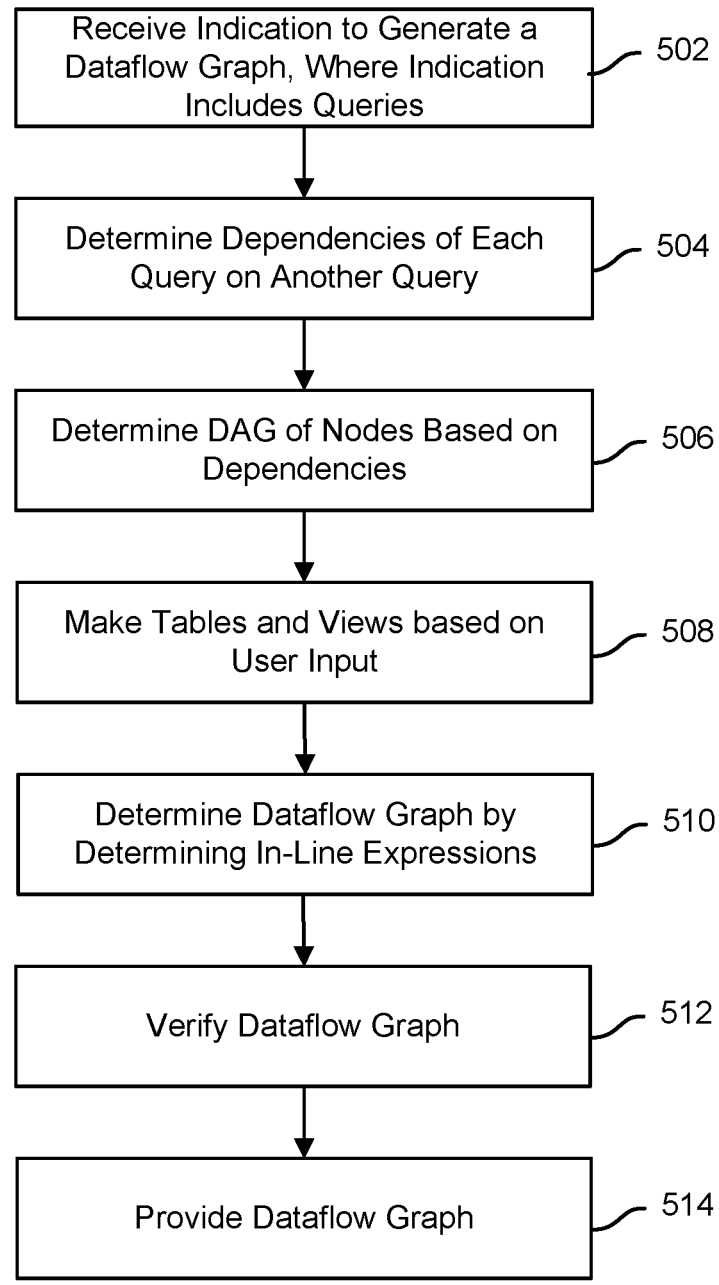
FIG. 5A is a flow diagram illustrating a process for generating a dataflow graph in accordance with some embodiments.

FIG. 5A is a flow diagram illustrating a process for generating a dataflow graph in accordance with some embodiments. In the example shown, process 500 is implemented by a database management system, such as database management system 112. In some embodiments, process 500 is implemented to perform some or all of step 404 of process 400.

In 502, an indication is received to generate a dataflow, where the indication includes queries. For example, a set of structured query language (SQL) queries are received that describe how to compute a data set. In some embodiments, the set of queries are written in a domain specific language.

In 504, dependencies are determined of each query on another query. For example, the set of queries are analyzed for a primitive: a read. The primitives are used to determine dependencies between datasets or tables to enable the describing the queries as a directed acyclic graph (DAG).

In 506, a DAG of nodes is determined based on the dependencies. For example, the leaves of the DAG are the inputs and the nodes with no dependents are the outputs. The queries are analyzed to create a DAG of nodes. For example, in this graph there is an edge from A to B if the query for B includes a read from A. The DAG is generated by determining all connections. In various embodiments, a depth-first search or breadth-first search is used to find the "roots" (or starting points, or "sources") of the graph and finds an ordering of the nodes (the datasets) of the graph that reflects the data dependencies. The declarative set of queries and/or commands do not specify an order in which they are to be performed. For example, a query may read data from a column of a table that does not exist until a transformation is performed on data associated with a different table to create the column. In this example, the query must be performed after the transformation. A database management system will be unable to perform the set of queries and/or commands in the event they are provided to the database management system in an incorrect order. In some embodiments, a graph generator is configured to generate the DAG of nodes in part by identifying one or more data sources that do not depend from other inputs, determining one or more flows that depend from the one or more identified data sources, and updating the DAG of nodes to indicate an input-flow-output relationship. In some embodiments, the flow comprises a query. The DAG of nodes is further generated in part by identifying one or more flows that depend from the one or more determined flows and updating the DAG of nodes to indicate an input-flow-output relationship. This process repeats until the DAG of nodes represents how data is going to flow in the set of queries and/or commands.

In 508, tables and views are made based on user input. For example, the datasets associated with the nodes of the DAG are designated as views or as tables. Views differ from tables in that views do not have materialized tables. In some embodiments, the datasets are materialized for later analyses, for storage, or for any other appropriate purposes. In some embodiments, the tables comprise canonicalized data that are consumable by later processing.

In 510, a dataflow graph is created by determining in-line expressions. For example, in-line expressions are generated for tables that are determined from prior tables where the in-line expressions composite all views (e.g., processing for view nodes between table nodes) that are in between tables in the ordered graph. The dataflow graph enables the database management system to perform the set of queries and/or commands in the correct order without a user specifying the correct order. The dataflow graph is a representation of how data is going to flow in the set of queries and/or commands.

In 512, the dataflow graph is verified. For example, the generated dataflow graph is verified by determining whether there are any errors associated with the generated dataflow graph. In some embodiments, a query included in the set of queries and/or commands may reference a column that does not exist in a table associated with a source. A dataflow graph analyzer is configured to identify, if any, one or more errors associated with the set of queries and/or commands.

In 514, the dataflow graph is provided. For example, a dataflow graph is provided to a user or system that indicated to generate the dataflow graph. In some embodiments, the dataflow graph is stored to make available the processing flow of the set of queries at a later time.

In some embodiments, a report is generated and provided. For example, the report indicates whether the generated dataflow graph is verified as being error free or not verified if there are any errors associated with the set of queries and/or commands. In some embodiments, the report specifies if an error is associated with a particular table or view. In some embodiments, the dataflow graph analyzer is able to generate the report without having to materialize the tables associated with the set of queries and/or commands. This significantly reduces the amount of time and resources needed by the database management system to determine whether there are any problems associated with the generated dataflow graph.

Figure 5B:
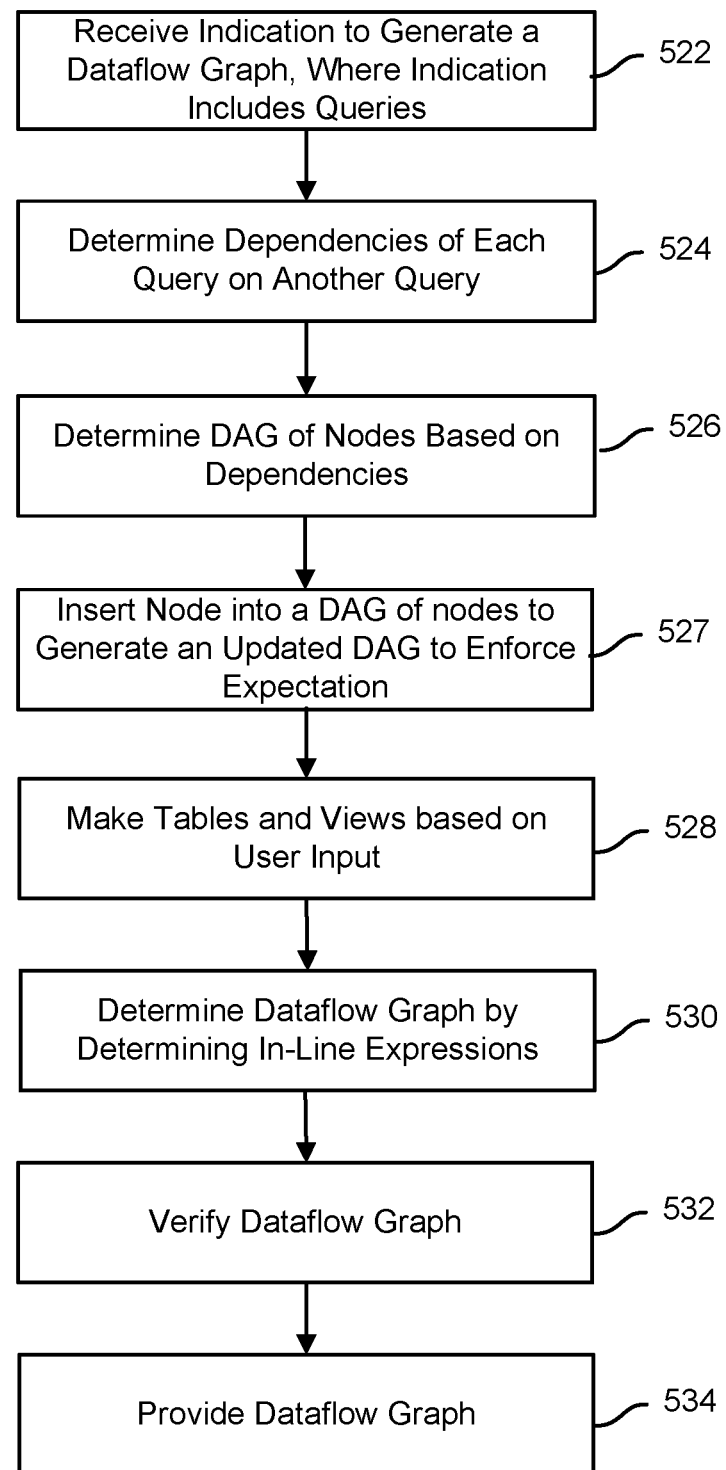
FIG. 5B is a flow diagram illustrating a process for generating a dataflow graph in accordance with some embodiments.

FIG. 5B is a flow diagram illustrating a process for generating a dataflow graph in accordance with some embodiments. In the example shown, process 520 is implemented by a database management system, such as database management system 112. In some embodiments, process 520 is implemented to perform some or all of step 404 of process 400.

In 522, an indication is received to generate a dataflow, where the indication includes queries. For example, a set of structured query language (SQL) queries are received that describe how to compute a data set. In some embodiments, the set of queries are written in a domain specific language.

In 524, dependencies are determined of each query on another query. For example, the set of set of queries are analyzed for a primitive: a read. The primitives are used to determine dependencies between datasets to enable the describing the queries as a DAG.

In 526, a DAG of nodes is determined based on the dependencies. For example, the leaves of the DAG are the inputs and the nodes with no dependents are the outputs. The queries are analyzed to create a DAG of nodes. For example, in this graph there is an edge from A to B if the query for B includes a read from A. The DAG is generated by determining all connections. In various embodiments, a depth-first search or breadth-first search is used to find the "roots" (or starting points, or "sources") of the graph and finds an ordering of the nodes (the datasets) of the graph that reflects the data dependencies. In various embodiments, determining the dataflow graph comprises a depth first search, a breadth first search, or any other appropriate process for helping to determine a graph. The declarative set of queries and/or commands do not specify an order in which they are to be performed. For example, a query may read data from a column of a table that does not exist until a transformation is performed on data associated with a different table to create the column. In this example, the query must be performed after the transformation. A database management system will be unable to perform the set of queries and/or commands in the event they are provided to the database management system in an incorrect order. In some embodiments, a graph generator is configured to generate the DAG of nodes in part by identifying one or more data sources that do not depend from other inputs, determining one or more flows that depend from the one or more identified data sources, and updating the DAG of nodes to indicate an input-flow-output relationship. In some embodiments, the flow comprises a query. The DAG of nodes is further generated in part by identifying one or more flows that depend from the one or more determined flows and updating the DAG of nodes to indicate an input-flow-output relationship. This process repeats until the DAG of nodes represents how data is going to flow in the set of queries and/or commands.

In 527, node is inserted into a DAG of nodes to generate an updated DAG to enforce an expectation. For example, the DAG is analyzed to determine an insertion location where an expression is inserted to enforce an expectation. A node is inserted where the expression is determined to be inserted (e.g., connect input of expectation node to output of node prior to insertion location, connect output of expectation node to node input of node subsequent to insertion location, connect additional output of expectation node for forking on a condition to an input of a fork node, etc.). The node receives input from the node prior to the insertion and outputs to the node subsequent to the node. In various embodiments, the expectation node inserts constraint enforcement, the expectation node checks a condition on input data, stops processing in response to an input data not meeting a condition (e.g., shunt process to a fork node that stops process), stops processing in response to an input data meeting a condition (e.g., shunt process to a fork node that stops process), drops an input data in response to the input data not meeting a condition (e.g., shunt process to a fork node that directs processing to a next input data), drops an input data in response to the input data meeting a condition (e.g., shunt process to a fork node that directs processing to a next input data), counts an input data in response to the input data not meeting a condition (e.g., branches processing to output count to a node that can generate a report), counts an input data in response to the input data meeting a condition (e.g., branches processing to output count to a node that can generate a report), quarantining an input data in response to not meeting a condition (e.g., shunt process to a fork node that stores the input data for later analysis and directs processing to a next input data), quarantining an input data in response to meeting a condition (e.g., shunt process to a fork node that stores the input data for later analysis and directs processing to a next input data), determines a percentage of input data meeting a condition (e.g., branches processing to output percentage to a node that can generate a report), determines a percentage of input data not meeting a condition (e.g., branches processing to output percentage to a node that can generate a report), reports statistics regarding input data and a condition (e.g., branches processing to output statistics to a node that can generate a report), transforms input data in response to a condition, or any other appropriate action related to the expectation node.

In some embodiments, a condition is checked on output data to ensure that the result of processing a record is valid.

In some embodiments, an expectation is checked on a single record. In some embodiments, an expectation is checked on multiple records or all records or all rows. For example, an expectation is used to check that there are no duplicates in rows, outputs, inputs, etc. In some embodiments, an expectation checks the percentage of all input/output records that satisfy a condition or do not satisfy a condition. In some embodiments, an expectation validates a condition over a time window. In some embodiments, an expectation based on the condition drops or quarantines all records meeting the condition.

In some embodiments, a plurality of nodes is inserted to enforce a plurality of expectations.

In 528, tables and views are made based on user input. For example, the datasets associated with the nodes of the DAG are designated as views or as tables. Views differ from tables in that views do not have materialized tables. In some embodiments, the datasets are materialized for later analyses, for storage, or for any other appropriate purposes. In some embodiments, the tables comprise canonicalized data that are consumable by later processing.

In 530, a dataflow graph is created by determining in-line expressions. For example, in-line expressions are generated for tables that are determined from prior tables where the in-line expressions composite all views (e.g., processing for view nodes between table nodes) that are in between tables in the ordered graph. The dataflow graph enables the database management system to perform the set of queries and/or commands in the correct order without a user specifying the correct order. The dataflow graph is a representation of how data is going to flow in the set of queries and/or commands.

In 532, the dataflow graph is verified. For example, the generated dataflow graph is verified by determining whether there are any errors associated with the generated dataflow graph. In some embodiments, a query included in the set of queries and/or commands may reference a column that does not exist in a table associated with a source. A dataflow graph analyzer is configured to identify, if any, one or more errors associated with the set of queries and/or commands.

In 534, the dataflow graph is provided. For example, a dataflow graph is provided to a user or system that indicated to generate the dataflow graph. In some embodiments, the dataflow graph is stored to make available the processing flow of the set of queries at a later time.

In some embodiments, a report is generated and provided. For example, the report indicates whether the generated dataflow graph is verified as being error free or not verified if there are any errors associated with the set of queries and/or commands. In some embodiments, the report specifies if an error is associated with a particular table or view. In some embodiments, the dataflow graph analyzer is able to generate the report without having to materialize the tables associated with the set of queries and/or commands. This significantly reduces the amount of time and resources needed by the database management system to determine whether there are any problems associated with the generated dataflow graph.

Figure 5C:
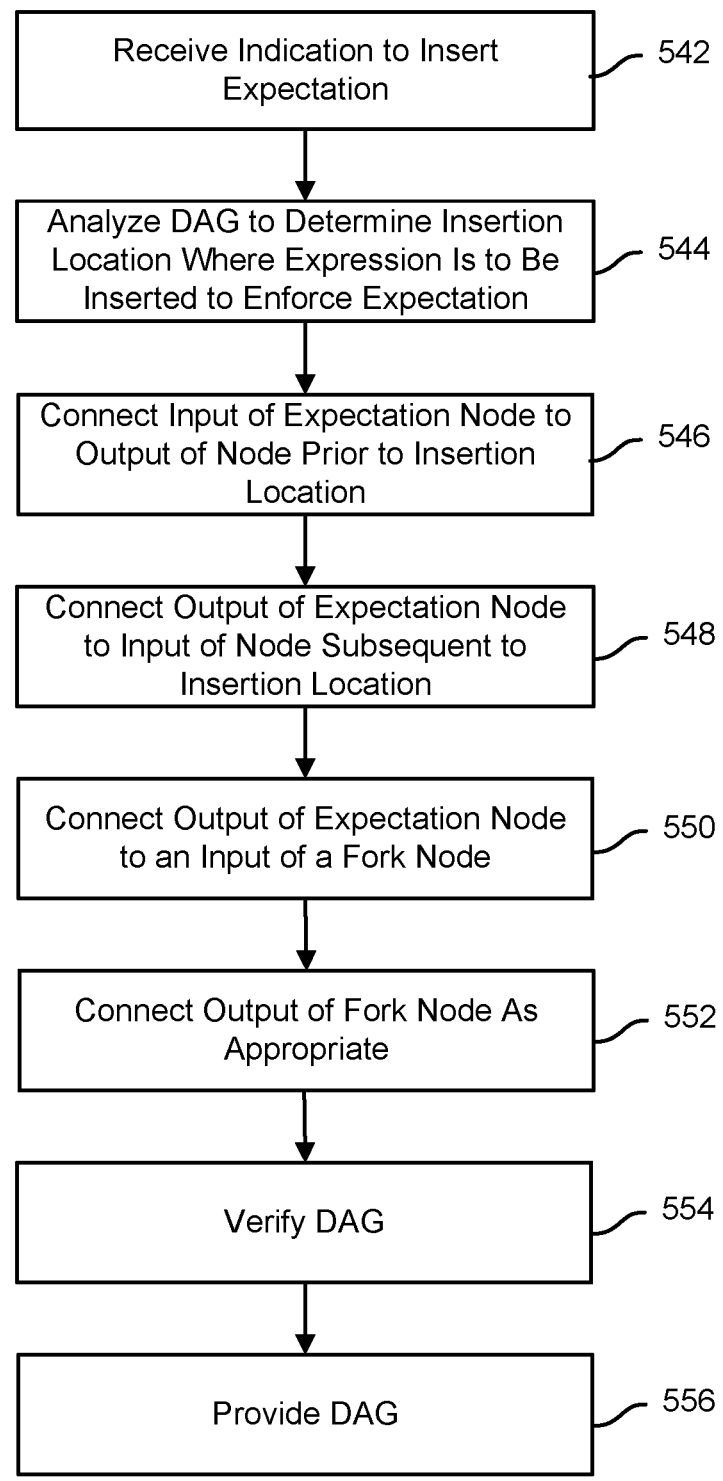
FIG. 5C is a flow diagram illustrating an embodiment for inserting a node to enforce expectations.

FIG. 5C is a flow diagram illustrating an embodiment for inserting a node to enforce expectations. In some embodiments, process 540 of FIG. 5C is used to implement 525 of FIG. 5B. In the example shown, in 542 an indication is received to insert an expectation. For example, an expression as implemented in a node that is inserted into the DAG.

In 544, the DAG is analyzed to determine an insertion location where the expression is to be inserted to enforce an expectation. For example, the DAG is analyzed to determine where in the processing chain that an expectation needs to be located to be appropriately enforced.

In 546, the input node of the expectation node is connected to the output of the node prior to the insertion location. For example, the expectation node with its processing expression is connected to the output of the node prior to the insertion location.

In 548, the output node of the expectation node is connected to the input of the node subsequent to the insertion location. For example, the expectation node with its processing expression is connected to the input of the node subsequent to the insertion location.

In 550, the output of the expectation node is connected to the input of a fork node. For example, the output of an expectation node is connected to a fork node that provides processing of the expectation that is not in line with the processing of the DAG (e.g., in response to an input data meeting or not meeting a condition, stopping processing, quarantining data, shunting processing after dropping input data, reporting data, etc.), In 552, the output of the fork node is connected as appropriate. For example, the output of the fork node is connected to loop back to the start of processing, to an end of the process, etc.

In 554, the DAG is verified. For example, the DAG is verified for the appropriate functioning of the expectation.

In 556, the DAG is provided. For example, the DAG is provided for the remaining process of determining a dataflow graph.

Figure 6:
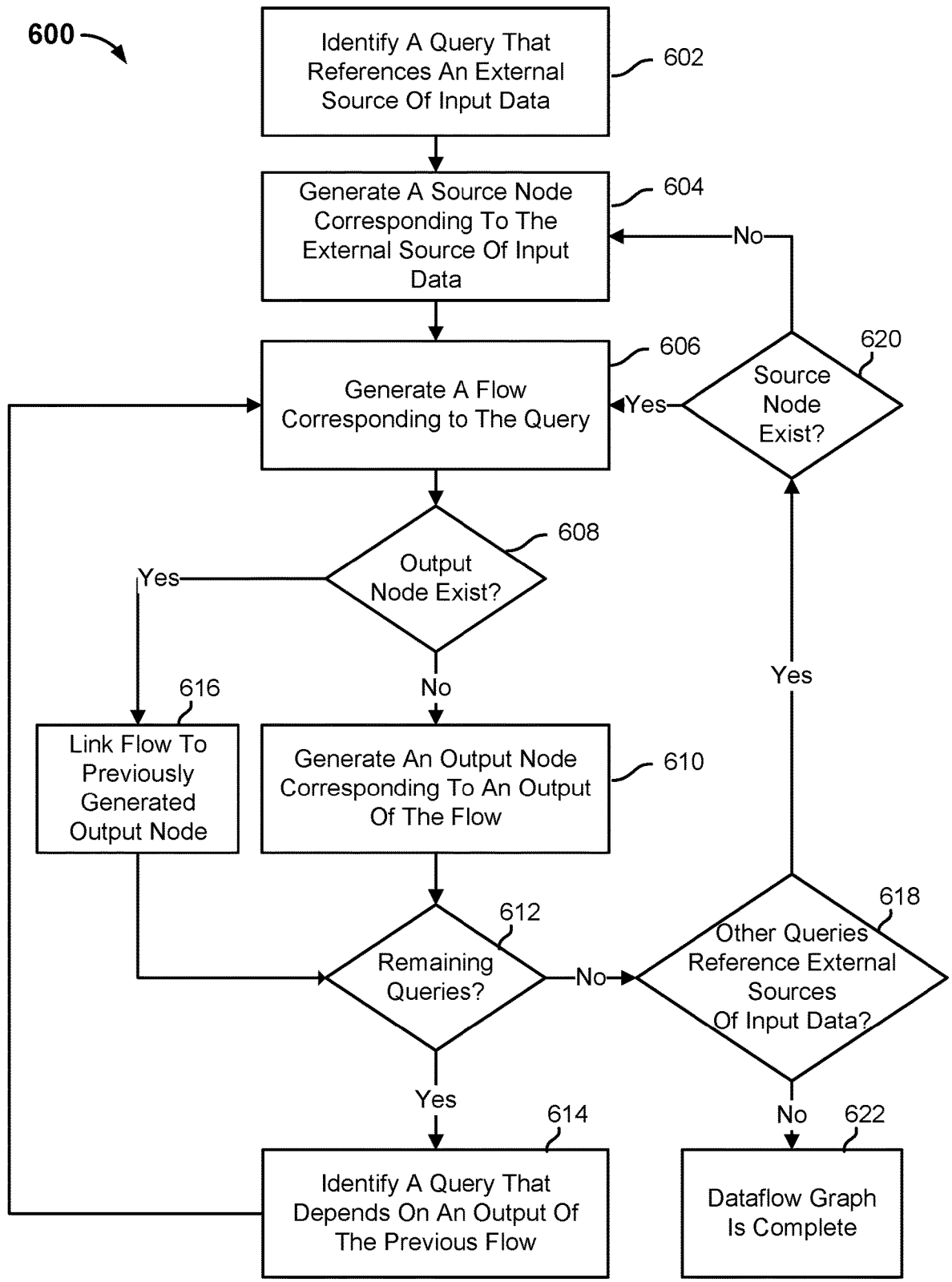
FIG. 6 is a flow diagram illustrating a process for generating a dataflow graph in accordance with some embodiments.

FIG. 6 is a flow diagram illustrating a process for generating a dataflow graph in accordance with some embodiments. In the example shown, process 600 is implemented by a database management system, such as database management system 112. In some embodiments, process 600 is implemented to perform some or all of step 506 of process 400.

At 602, a query that references an external source of input data is identified. A user may provide a set of queries and/or commands to perform with respect to a set of data. At least one of the queries references an external source of input data.

At 604, a source node corresponding to the external source of input data is generated. At 606, a flow corresponding to the query is generated. At 608, it is determined whether an output node for the flow already exists in the dataflow graph. In the event an output node for the flow already exists in the dataflow graph, process 600 proceeds to 616. In the event an output node for the flow does not already exist, process 600 proceeds to 610.

At 610, an output node corresponding to an output of the flow is generated. At 612, it is determined whether there are any more queries included in the set of queries and/or commands that depend on the output of the previous flow. In the event there are remaining queries included in the set of queries and/or commands that depend on the output of the previous flow, process 600 proceeds to step 614. In the event there are no remaining queries included in the set of queries and/or commands, process 600 proceeds to step 618.

At 614, a query that depends on an output of the previous flow is identified. In some embodiments, a plurality of queries depends on an output of the previous flow. The steps of 614, 606, 608, 610/616 may be performed, in parallel, for such embodiments.

At 616, the flow is linked to a previously generated output node.

At 618, it is determined whether there are any other queries in the set of queries and/or commands that reference an external source of input data. In the event there are no other queries in the set of queries and/or commands that reference an external source of input data, process 600 proceeds to 622. In the event there are one or more other queries in the set of queries and/or commands that reference an external source of input data, process 600 proceeds to 620.

At 620, it is determined whether a source node corresponding to the external source of input data already exists in the dataflow graph. In the event a source node corresponding to the external source of input data already exists in the dataflow graph, process 600 proceeds to 606. In the event a source node corresponding to the external source of input data does not already exist in the dataflow graph, process 600 proceeds to 604.

At 622, the dataflow graph is completed.

Figure 7:
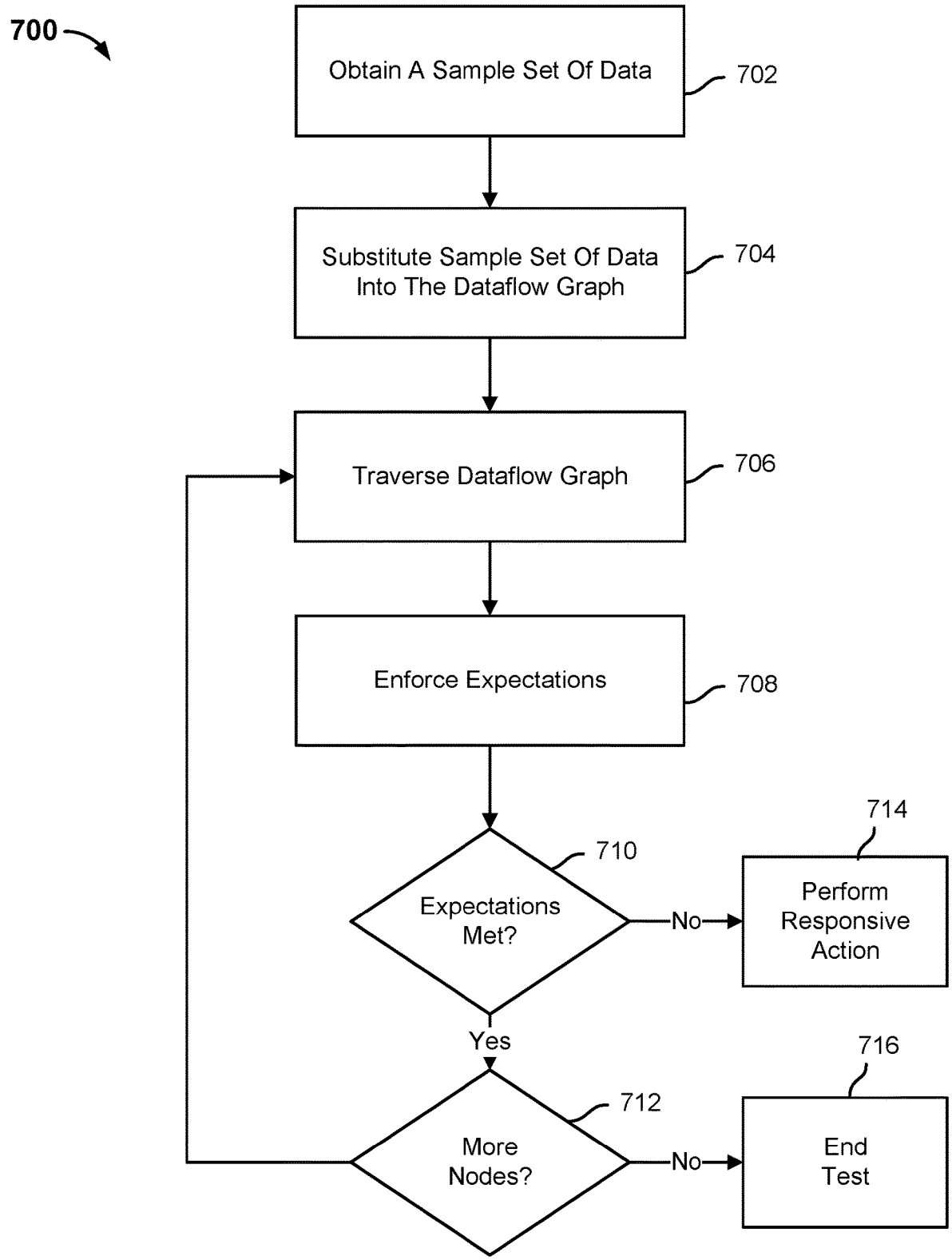
FIG. 7 is a flow diagram illustrating a process for testing a dataflow graph in accordance with some embodiments.

FIG. 7 is a flow diagram illustrating a process for testing a dataflow graph in accordance with some embodiments. In some embodiments, the process of FIG. 7 represents the execution of a graph in "batch" mode, where each query is executed over its entire input data, and queries are executed in the order of their data dependency. That is one possible strategy, especially if all input data is available when the execution starts. In some embodiments, the graph is executed in "streaming" or "continuous" mode. This mode assumes that more and more data will arrive during the execution, and execution conceptually never comes to an end. All queries are executed at the same time, continuously over the newly arriving data. Note that regardless of the execution mode, the system still creates a graph from an unordered set of queries, generates the in-lining of a view's query into the queries for the tables that read from the view, and creates the injection of expectation enforcement into the queries. In some embodiments, expectations are enforced both in test as well as in deployed production mode—the expectations are not only a way to test the graph, but also a way to enforce data quality throughout the execution of the graph.

In the example shown in FIG. 7, process 700 is implemented by a database management system, such as database management system 112. Process 700 is implemented to validate data quality. In some embodiments, process 700 is implemented to perform some or all of step 406 of process 400.

At 702, a sample set of data is obtained. In some embodiments, the sample set of data is manually generated. In some embodiments, the sample set of data is obtained from a storage location storing production data (e.g., cloud storage).

At 704, the set of data is substituted into the dataflow graph. The verified dataflow graph includes one or more nodes corresponding to sources that reference corresponding external storage locations. The dataflow graph tester is configured to modify the dataflow graph by substituting a source node that references an external storage location with a source node that references a local storage location of the database management system that stores the obtained sample set of data.

At 706, the dataflow graph is traversed.

At 708, expectations are enforced for some or all of the nodes. An expectation indicates one or more properties that data in a table associated with a node is expected to possess.

At 710, it is determined whether an expectation is met. In the event the expectation is met, process 700 proceeds to step 712. In the event the expectation is not met, process 700 proceeds to 714. At 712, it is determined whether there are more nodes to traverse in the dataflow graph. In the event that are more nodes to traverse, process 700 returns to step 706. In the event there are no more nodes to traverse, process 700 proceeds to step 716.

At 714, a responsive action is performed. In some embodiments, a flow is prevented from further execution until code causing the failed expectation is remediated. In various embodiments, the flow is aborted in response to the expectation being met or not being met. In various embodiments, the action performed comprises aborting the unit test, quarantining a flow output, generating an alert, and/or ignoring the unmet expectation, and/or any other appropriate action.

In some embodiments, a quarantine action occurs by isolating invalid records. An invalid record is redirected to a different table. The original record is preserved allowing it to be optionally fed back into the system after the pipeline has been updated.

In some embodiments, an alert is triggered. An alert is triggered when an invalid tuple is encountered or when the percentage of invalid records exceeds a predetermined threshold.

In some embodiments, the failed expectation is ignored. Some expectations may fail in unit tests, but do nothing in production.

At 716, the test is ended.

Figure 8:
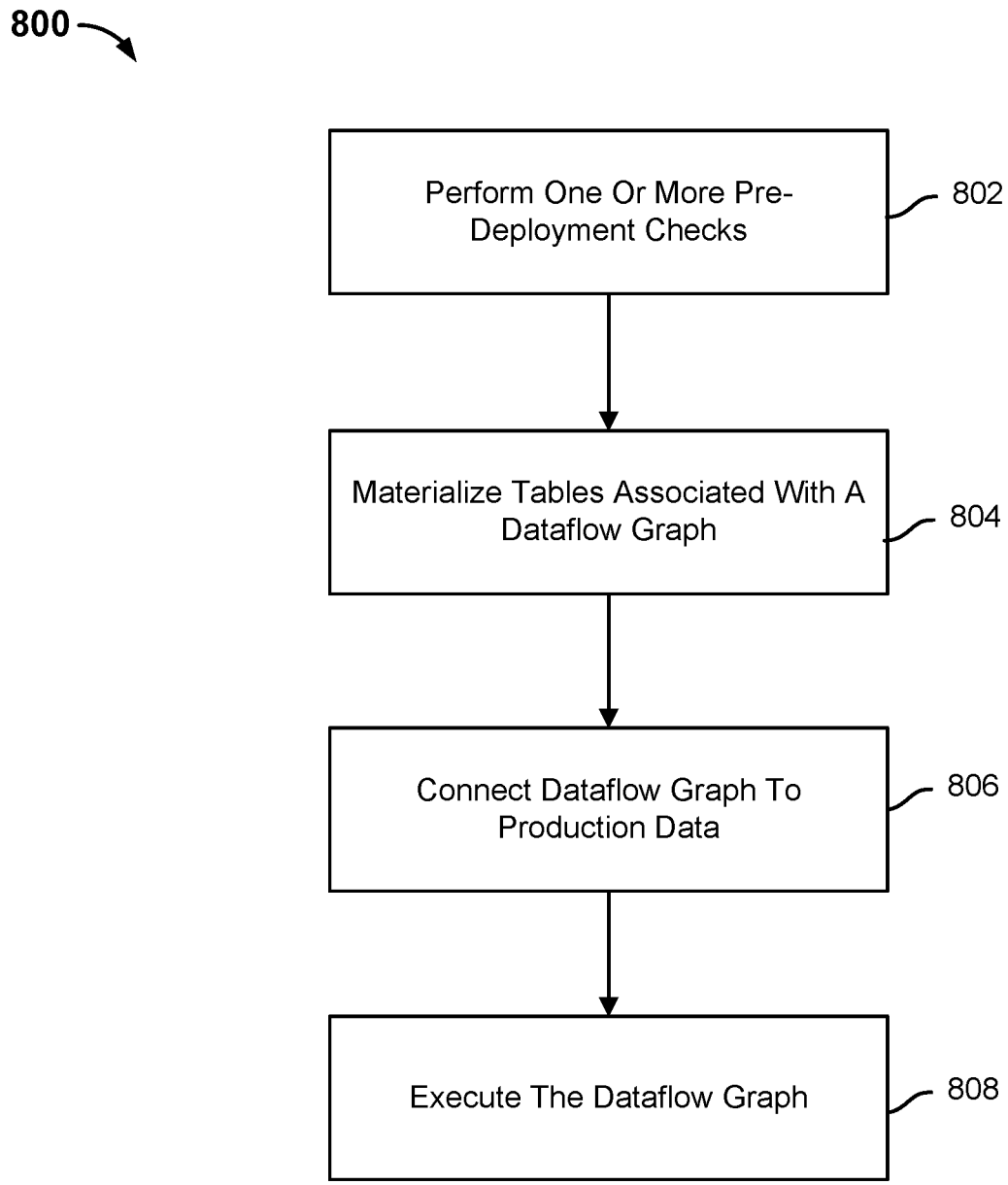
FIG. 8 is a flow diagram illustrating a process for deploying a dataflow graph in accordance with some embodiments.

FIG. 8 is a flow diagram illustrating a process for deploying a dataflow graph in accordance with some embodiments. In the example shown, process 800 is implemented by a database management system, such as database management system 112. In some embodiments, process 800 is implemented to perform some or all of step 408 of process 400.

At 802, one or more pre-deployment checks are performed. These pre-deployment checks may reduce costs due to failed deployments and limit downtime that would result from pushing bad code. A pre-deployment check may include performing one or more transformations, such as a difference transformation, an inference transformation, a validation transformation, and/or an iteration transformation.

At 804, tables associated with a dataflow graph are materialized.

At 806, the dataflow graph is connected to production data. One or more source nodes included in the dataflow graph reference one or more external sources. The dataflow graph is connected to the one or more external sources.

At 808, the dataflow graph is executed. In some embodiments, the dataflow graph is executed in triggered mode. In triggered mode, the dataflow graph is initiated, the dataflows are performed, and the dataflow graph is shut down after all the dataflows are performed. The dataflow graph is initiated by running any flow that does not have any internal dependencies (e.g., a flow that reads data from an external table). Datasets associated with the one or more flows that do not have any internal dependencies are updated. The dataflow graph is traversed to determine which flow can be run based on the updated table(s). The determined flows are executed and the one or more tables associated with the determined flows are updated. This process repeats until all of the flows have been executed and an output is written to a sink.

In some embodiments, the dataflow graph is executed in continuous mode. In continuous mode, the flows included in the dataflow graph are continually running and datasets associated with the flows are updated in response to data changes. In some embodiments, datasets are periodically updated (e.g., every 10 minutes).

Figure 9:
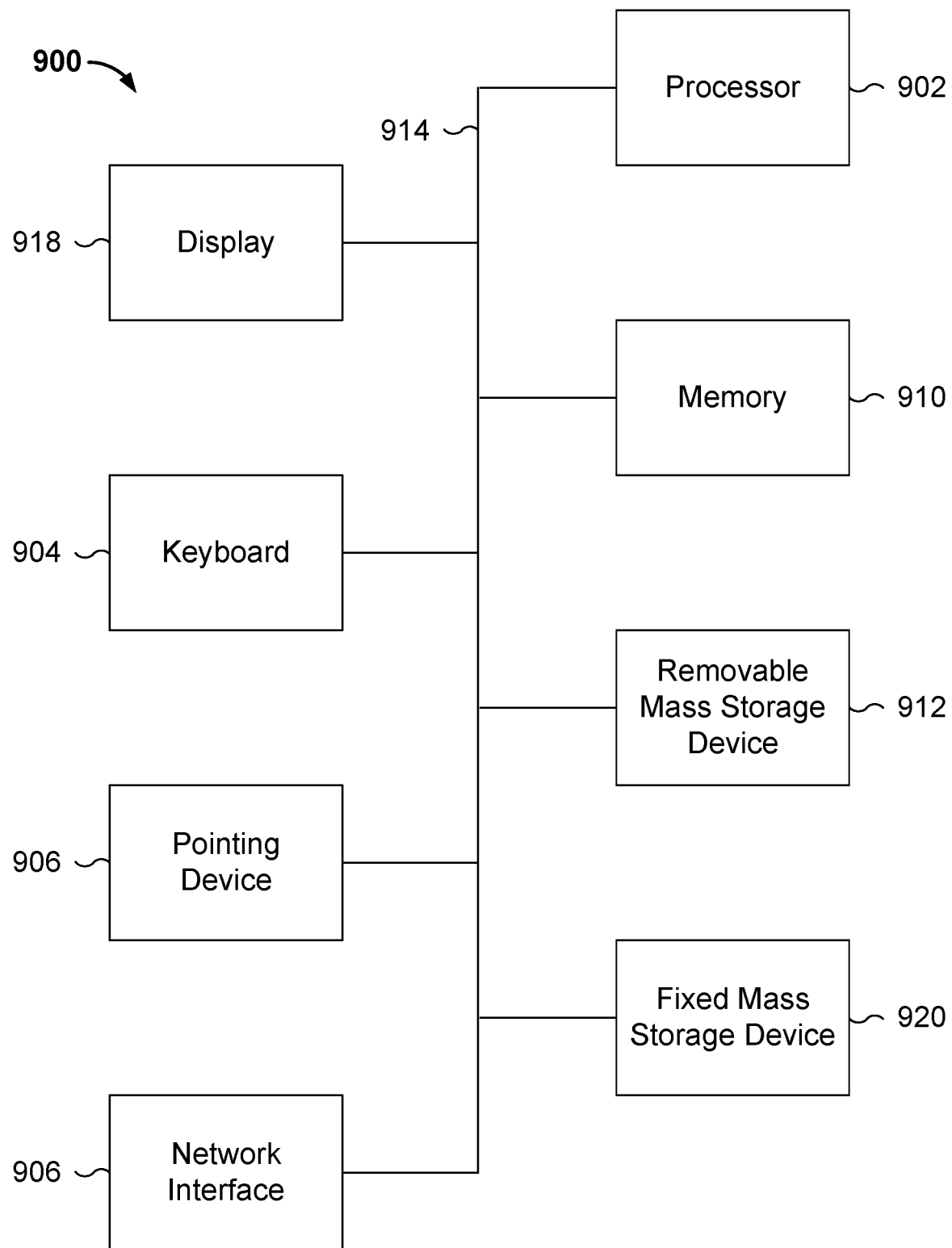
FIG. 9 is a functional diagram illustrating a computing device included in a database management system in accordance with some embodiments.

FIG. 9 is a functional diagram illustrating a computing device included in a database management system in accordance with some embodiments. As shown, FIG. 9 provides a functional diagram of a general purpose computer system programmed for generating, testing, and deploying a dataflow graph in accordance with some embodiments. As will be apparent, other computer system architectures and configurations can be used to execute event logging. Computing device 900, which includes various subsystems as described below, includes at least one microprocessor subsystem, also referred to as a processor or a central processing unit (e.g., processor 902). For example, processor 902 can be implemented by a single-chip processor or by multiple cores and/or processors. In some embodiments, processor 902 is a general purpose digital processor that controls the operation of the computer device 900. Using instructions retrieved from memory 910, the processor 902 controls the reception and manipulation of input data, and the output and display of data on output devices, for example display 918.

Processor 902 is coupled bi-directionally with memory 910, which can include a first primary storage, typically a random access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions, for example programmed instructions. For example, primary storage devices 910 can include any suitable computer-readable storage media, described below, depending on whether, for example, data access needs to be bi-directional or uni-directional. For example, processor 902 can also directly and very rapidly retrieve and store frequently needed data in a cache memory, not shown.

A removable mass storage device 912 provides additional data storage capacity for the computing device 900, and is coupled either bi-directionally (read/write) or uni-directionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912, 920 can be incorporated, if needed, in standard fashion as part of primary storage 910, for example RAM, as virtual memory.

In addition to providing processor 902 access to storage subsystems, bus 914 can be used to provide access to other subsystems and devices as well. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 902 can be used to connect the computer device 900 to an external network and transfer data according to standard protocols. For example, various process embodiments disclosed herein can be executed on processor 902, or can be performed across a network such as the Internet, intranet networks, or local area networks in conjunction with a remote processor that shares a portion of the processing. Throughout this specification, "network" refers to any interconnection between computer components including the Internet, Ethernet, intranet, local-area network, home-area network, serial connection, parallel connection, wide-area network, Fibre Channel, PCI/PCI-X, AGP, VLbus, PCI Express, Expresscard, Infiniband, ACCESS-.bus, Wireless LAN, WiFi, HomePNA, Optical Fibre, G.hn, infrared network, satellite network, microwave network, cellular network, virtual private network, Universal Serial Bus, FireWire, Serial ATA, 1-Wire, UNI/O, or any form of connecting homogenous, heterogeneous systems and/or groups of systems together. Additional mass storage devices, not shown, can also be connected to processor 902 through network interface 916.

An auxiliary I/O device interface, not shown, can be used in conjunction with computer device 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits, programmable logic devices, and ROM and RAM devices. Examples of program code include both machine code, as produced, for example, by a compiler, or files containing higher level code, for example, a script that can be executed using an interpreter.

The computer device shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, from a client device, an indication to generate a data processing pipeline, the data processing pipeline defined with respect to a set of operations, an operation configured to read one or more input data tables and transform the one or more input data tables into one or more output data tables, the operation represented as a declarative language, wherein at least two operations are not in order;
generating a dataflow graph based on dependencies between the set of operations of the data processing pipeline, comprising:
determining data dependencies between the set of operations of the data processing pipeline,
defining, based on the determined dependencies, an ordering in which the set of operations of the data processing pipeline is performed, and
generating the dataflow graph reflecting a correct ordering of the set of operations, the dataflow graph including a set of nodes and edges between the nodes, an edge in the dataflow graph representing a dependency between a node representing an input data table and another node representing an output data table for a respective operation;
verifying the dataflow graph without materializing the one or more input data tables based on the dependencies between the set of operations in the dataflow graph; and
executing, responsive to the verified dataflow graph, the set of operations associated with the data processing pipeline to provide a result of the execution to the client device.

2. The method of claim 1, wherein the one or more input data tables are different from the one or more output data tables.

3. The method of claim 1, wherein at least one node in the dataflow graph is a source node that represents an input data table referenced from an external storage location.

4. The method of claim 1, further comprising:
responsive to verifying the dataflow graph, obtaining a set of data; and
performing one or more tests on the verified dataflow graph by executing at least a portion of the set of operations on the set of data.

5. The method of claim 1, wherein an operation indicates one or more properties data in the one or more input tables or the one or more output tables is expected to possess.

6. The method of claim 1, further comprising presenting the dataflow graph on an interface generated on the client device.

7. The method of claim 1, wherein determining the data dependencies and defining the ordering further comprises:
identifying an operation in the set of operations that references an external source of input data, wherein the external source of input data is a storage system external to a system the data flow graph is stored;
generating a node corresponding to the external source of input data;
generating a flow corresponding to the identified operation; and
generating an output node for the flow in the dataflow graph.

8. A non-transitory computer-readable storage medium comprising stored instructions executable by a processor, the instructions when executed causing the processor to:
receive, from a client device, an indication to generate a data processing pipeline, the data processing pipeline defined with respect to a set of operations, an operation configured to read one or more input data tables and transform the one or more input data tables into one or more output data tables, the operation represented as a declarative language, wherein at least two operations are not in order;
generate a dataflow graph based on dependencies between the set of operations of the data processing pipeline, comprising:
determining data dependencies between the set of operations of the data processing pipeline,
defining, based on the determined dependencies, an ordering in which the set of operations of the data processing pipeline is performed, and
generating the dataflow graph reflecting a correct ordering of the set of operations, the dataflow graph including a set of nodes and edges between the nodes, an edge in the dataflow graph representing a dependency between a node representing an input data table and another node representing an output data table for a respective operation;
verify the dataflow graph without materializing the one or more input data tables based on the dependencies between the set of operations in the dataflow graph; and
execute, responsive to the verified dataflow graph, the set of operations associated with the data processing pipeline to provide a result of the execution to the client device.

9. The non-transitory computer-readable storage medium of claim 8, wherein the one or more input data tables are different from the one or more output data tables.

10. The non-transitory computer-readable storage medium of claim 8, wherein at least one node in the dataflow graph is a source node that represents an input data table referenced from an external storage location.

11. The non-transitory computer-readable storage medium of claim 8, wherein the stored instructions further comprise instructions that when executed cause the processor to:
determine that the dataflow graph has been verified;
obtain a set of data; and
perform one or more tests on the verified dataflow graph by executing at least a portion of the set of operations on the set of data.

12. The non-transitory computer-readable storage medium of claim 8, wherein an operation indicates one or more properties data in the one or more input tables or the one or more output tables is expected to possess.

13. The non-transitory computer-readable storage medium of claim 8, wherein the dataflow graph is verified without materializing the source datasets of the data processing pipeline.

14. The non-transitory computer-readable storage medium of claim 8, wherein the stored instructions further comprise instructions that when executed cause the processor to:

present the dataflow graph on an interface generated on the client device.

15. The non-transitory computer-readable medium of claim 8, wherein the instructions further cause the processor to:

identifying an operation in the set of operations that references an external source of input data, wherein the external source of input data is a storage system external to a system the data flow graph is stored;

generating a node corresponding to the external source of input data;

generating a flow corresponding to the identified operation; and generating an output node for the flow in the dataflow graph.

16. A computer system, comprising:

a computer processor; and a non-transitory computer-readable storage medium comprising instructions that when executed by the computer processor cause the computer system to perform actions comprising:

receiving, from a client device, an indication to generate a data processing pipeline, the data processing pipeline defined with respect to a set of operations, an operation configured to read one or more input data tables and transform the one or more input data tables into one or more output data tables, the operation represented as a declarative language, wherein at least two operations are not in order;

generating a dataflow graph based on dependencies between the set of operations of the data processing pipeline, comprising:

determining data dependencies between the set of operations of the data processing pipeline, defining, based on the determined dependencies, an ordering in which the set of operations of the data processing pipeline is performed, and generating the dataflow graph reflecting a correct ordering of the set of operations, the dataflow graph including a set of nodes and edges between the nodes, an edge in the dataflow graph representing a dependency between a node representing an input data table and another node representing an output data table for a respective operation;

verifying the dataflow graph without materializing the one or more input data tables based on the dependencies between the set of operations in the dataflow graph; and executing, responsive to the verified dataflow graph, the set of operations associated with the data processing pipeline to provide a result of the execution to the client device.

17. The computer system of claim 16, wherein the one or more input data tables are different from the one or more output data tables.

18. The computer system of claim 16, wherein at least one node in the dataflow graph is a source node that represents an input data table referenced from an external storage location.

19. The computer system of claim 16, wherein the actions further comprise:

responsive to verifying the dataflow graph, obtaining a set of data; and performing one or more tests on the verified dataflow graph by executing at least a portion of the set of operations on the set of data.

20. The computer system of claim 16, wherein an operation indicates one or more properties data in the one or more input tables or the one or more output tables is expected to possess.

21. The computer system of claim 16, wherein the dataflow graph is verified without materializing the source datasets of the data processing pipeline.

22. The computer system of claim 16, wherein the instructions further cause the computer system to perform actions comprising:

identifying an operation in the set of operations that references an external source of input data, wherein the external source of input data is a storage system external to a system the data flow graph is stored;

generating a node corresponding to the external source of input data;

generating a flow corresponding to the identified operation; and generating an output node for the flow in the dataflow graph.

* * * * *